(12) United States Patent
Smyth

(10) Patent No.: US 8,922,587 B2
(45) Date of Patent: Dec. 30, 2014

(54) CREW SHARED VIDEO DISPLAY SYSTEM AND METHOD

(71) Applicant: U.S. Army Research Laboratory ATTN: RDRL-LOC-I, Adelphi, MD (US)

(72) Inventor: Christopher C. Smyth, Fallston, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/803,611

(22) Filed: Mar. 14, 2013

(65) Prior Publication Data

US 2014/0267388 A1 Sep. 18, 2014

(51) Int. Cl.
| | |
|---|---|
| G09G 5/12 | (2006.01) |
| G09G 5/14 | (2006.01) |
| G06F 3/042 | (2006.01) |
| G06F 3/01 | (2006.01) |
| G06F 3/043 | (2006.01) |

(52) U.S. Cl.
CPC ............... *G09G 5/14* (2013.01); *G06F 3/0425* (2013.01); *G06F 3/017* (2013.01); *G06F 3/043* (2013.01); *G06F 3/014* (2013.01)
USPC ......................................................... 345/629

(58) Field of Classification Search
CPC ....................................................... G09G 5/006
USPC ......................................................... 345/629
See application file for complete search history.

(56) References Cited

U.S. PATENT DOCUMENTS

| | | | | |
|---|---|---|---|---|
| 6,670,892 | B2 * | 12/2003 | Block | 340/963 |
| 6,756,965 | B2 | 6/2004 | Combs et al. | |
| 2001/0046007 | A1 * | 11/2001 | Greene et al. | 349/73 |
| 2004/0239757 | A1 * | 12/2004 | Alden | 348/51 |
| 2005/0053274 | A1 * | 3/2005 | Mayer et al. | 382/154 |
| 2007/0058092 | A1 * | 3/2007 | Ryu | 348/836 |
| 2007/0263080 | A1 * | 11/2007 | Harrell et al. | 348/14.08 |
| 2009/0295835 | A1 * | 12/2009 | Husoy | 345/660 |
| 2011/0055703 | A1 * | 3/2011 | Lundback et al. | 715/727 |

(Continued)

OTHER PUBLICATIONS

Avery LW, Sanquist TF, O'Mara PA, Shepard AP, & DT Donohoo (1999). U.S. Army Weapon Systems Human-Computer Interface (WSHCI) Style Guide, Version 3, Dec. 1999, Richland, WA: The Pacific Northwest National Laboratory, pp. 5-3; 5-4 and 5-6.

(Continued)

*Primary Examiner* — Javid A Amini
(74) *Attorney, Agent, or Firm* — Eric B. Compton

(57) ABSTRACT

A dual-image display for at least two crewmembers who may interact independently with the display using touch screen buttons, switches, or hand controllers. The display enables the simultaneous display of different information and visual content depending on the viewing angle or direction. In one embodiment, a video display system for use by crewmembers in vehicles may include: a computer processor; a display monitor comprising a common display driver configured to provide separate virtual displays to at least two crewmember users, the virtual displays being visible to a respective user based on the an angle of view of the respective user; and one or more activators operatively associated with the users, wherein said display monitor is configured to be activated by said one or more activators of said users according to a user priority determination algorithm executed by said computer processor.

23 Claims, 29 Drawing Sheets

(56) References Cited

U.S. PATENT DOCUMENTS

| | | | |
|---|---|---|---|
| 2013/0016102 A1* | 1/2013 | Look et al. | 345/426 |
| 2013/0235077 A1* | 9/2013 | Hunkins et al. | 345/629 |
| 2013/0242050 A1* | 9/2013 | Choi et al. | 348/43 |
| 2013/0250057 A1* | 9/2013 | Choi et al. | 348/43 |

OTHER PUBLICATIONS

Biberman LM (1973). "Image Quality." LM Biberman (Ed). Perception of Displayed Information. New York: Plenum, p. 13.

Department of Defense (1999). Design Criteria Standard: Human Engineering, MIL-STD-1472F, Aug. 23, 1999, Washington, DC: U.S. Government Printing Office.

DisplayMate Technologies Corporation (2003) Display-Mate for Windows Reference Manual (MultiMedia Edition), Amherst NH: Author.

Gianaros PJ, Muth ER, Mordkoff JT, Levine ME, & RM Stern (2001). "A Questionnaire for the Assessment of the Multiple Dimensions of Motion Sickness." Aviation, Space, and Environmental Medicine, 72 [2]. Feb., pp. 115-119.

Grether WF & CA Baker (1972). "Visual Presentation of Information." HP Van Cott & RG Kinkade (Eds.), Human Engineering Guide to Equipment Design, Washington, DC: U.S. Government Printing Office, p. 103.

Hart, S.G. & Staveland, L. (1988). "Development of the NASA Task Load Index (TLX): Results of empirical and theoretical research." in P.A. Hancock and N. Meshkati (Eds.) Human Mental Workload, pp. 139-183. Amsterdam: North-Holland.

Kennedy, R. S., Lilienthal, M. G., Berbaum, K. S., Baltzley, D. R. & M. E. McCauley (1989). "Simulator sickness in U.S. Navy flight simulators." Aviation, Space, and Environmental Medicine, 60: 10-16.

Robert S. Kennedy, Norman E. Lane, Kevin S. Berbaum & Michael G. Lilienthal (1993): Simulator Sickness Questionnaire: An Enhanced Method for Quantifying Simulator Sickness, The International Journal of Aviation Psychology, 3:3, 203-220.

Rosell FA & RH Willson (1973). "Recent Psychophysical Experiments and the Display Signal-to-Noise Ratio Concept." LM Biberman (Ed). Perception of Displayed Information. New York: Plenum, pp. 184-185.

Sanders MS & EJ McCormick (1993). Human Factors in Engineering and Design. New York: McGraw-Hill, Inc., p. 1530, Table 16-3.

Department of Defense (2001). Interface Standard Lighting, Aircraft, Night Vision Imaging System (NVIS) Compatible, MIL-STD-3009, Feb. 2, 2001, Washington, DC: U.S. Government Printing Office.

* cited by examiner

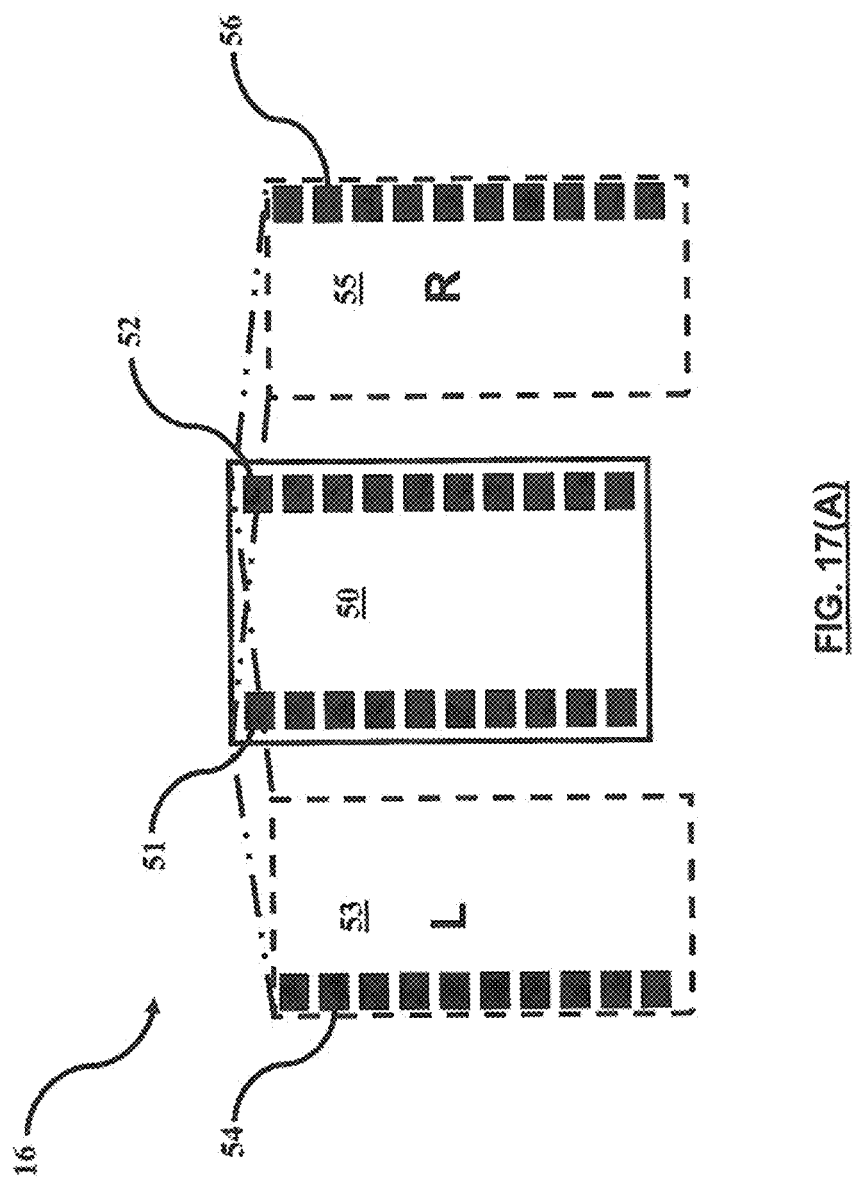

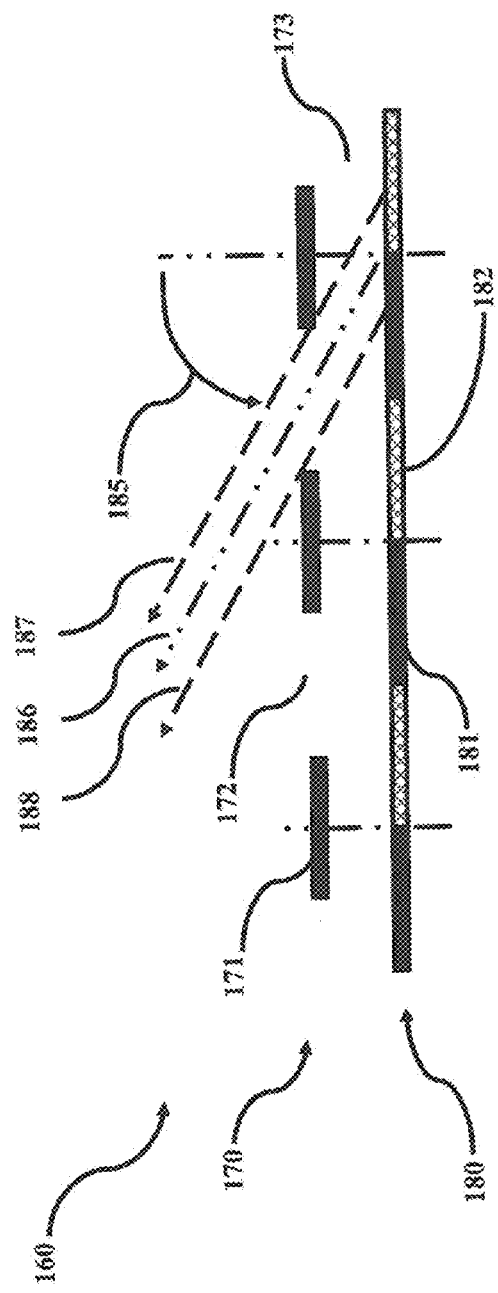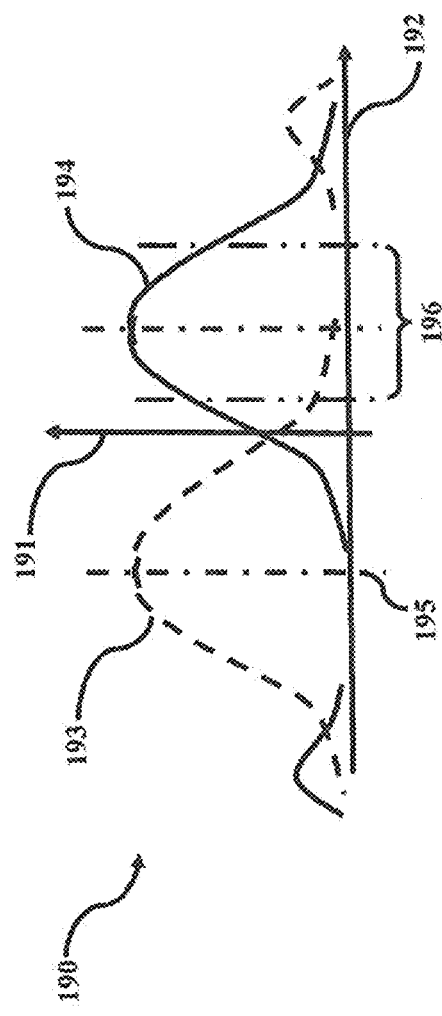
FIG. 17(B)
FIG. 17(C)

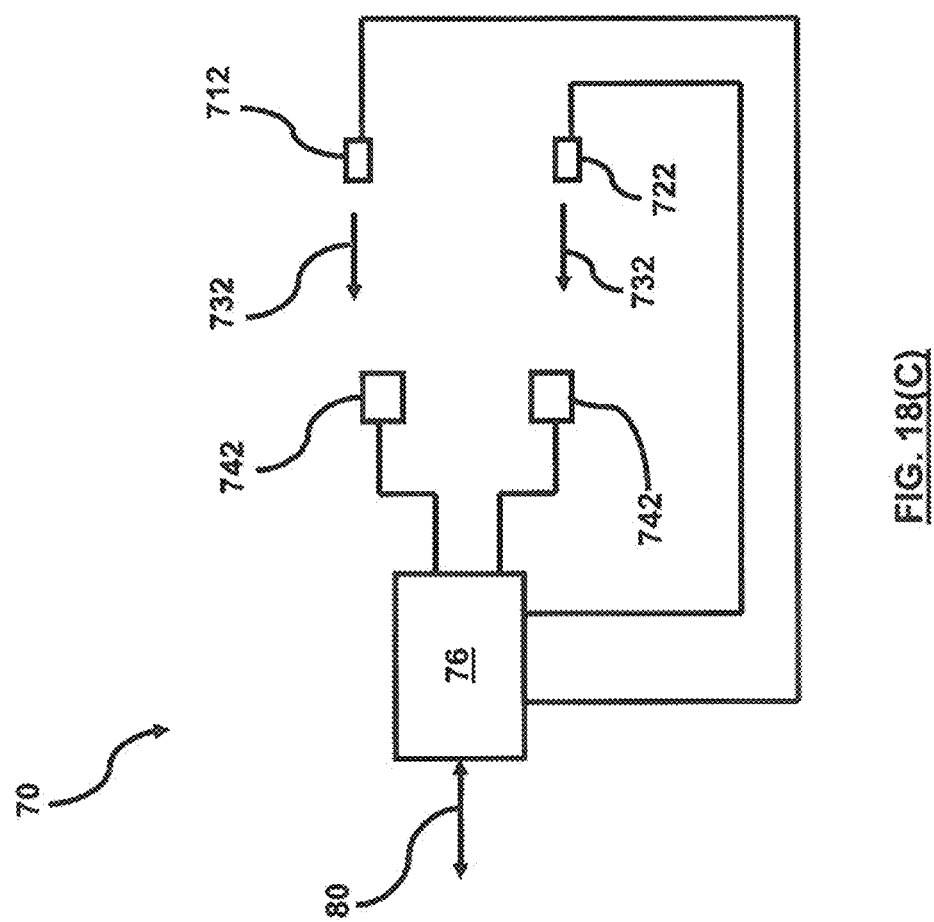

CREW SHARED VIDEO DISPLAY SYSTEM AND METHOD

GOVERNMENT INTEREST

The embodiments described herein may be manufactured, used, and/or licensed by or for the United States Government without the payment of royalties thereon.

BACKGROUND

1. Technical Field

The embodiments herein generally relate to crew station designs in combat, assault, and tactical vehicles, and, more particularly in manned armored-ground vehicles.

2. Description of the Related Art

With the increased tactical information available in network centric warfare, the increased use of armor for protection, and the limitations imposed on vehicle size by transportation requirements, there is a need for crew-shared displays and a means for operating the same in vehicle crew stations. This is true for crew-manned helicopters, tactical command and control centers, as well as combat, assault, and tactical vehicles, and particularly future armored-ground vehicles, all having side-by-side crew configurations. In these vehicles, the timely use of the increased tactical information is dependent upon relatively-large, high resolution video displays for the maintenance of situational awareness. When entrance and exit hatches and other ports open to the exterior are secured, armored vehicles maneuver with on-board indirect-vision systems providing driving scenes on video-displays located in the crew station. These vehicle designs require relatively large area, high resolution video displays to function effectively; however, the requirement for rapid deployment by tactical aircraft restricts vehicle size. This is true for a helicopter with a pilot and co-pilot sitting side-by side sharing displays and controls, a control center for an autonomous unmanned tactical aircraft or ground vehicle with an operator and asset manager sharing displays and controls, and an armored ground-vehicle with a multi-person crew.

In particular, prototype designs of future manned armored-ground vehicles have a common crew station with two crewmembers, driver and commander, sitting side-by-side who operate the vehicle from video, auditory, and tactile information displays and hand, foot, and voice-operated controls. The video displays are mounted across the panel in front of the crew and are multifunctional showing the external driving scene, situational maps, and system status as selected by the user based on the role and permissions. One planning requirement for these military vehicles is that they are air transportable and in particular by the C-130, the United States Air Force's primary tactical transporter. This requirement limits the width to approximately 102 inches for a wheeled vehicle (approximately 100 inches for a tracked vehicle). This size restriction limits the display area afforded the crew and the information that can be presented at any one time. One consequence is that displays developed in prior engineering efforts for larger vehicles cannot be readily incorporated in these designs, therefore necessitating further software programming effort and time, and resulting ultimately in reduced standardization across vehicles and increased training needs.

The crew station displays intended for these vehicles are commonly standard thin-film transistor (TFT) Liquid Crystal Displays (LCD) showing one display. The displays are manually-operated by touch screen buttons (i.e., switches), bezel switches that are mounted about the edges of the display, and panel contact switches. In addition, some designs may include hand controllers for operating the displays. Because of space limitations, and because reasonably sized displays are needed to maintain situational awareness, the displays in some crew station designs are limited to three displays across the viewing front of the crew compartment as well as two smaller wing displays, one on each side. With this crew station design, the center (i.e., middle) display is shared by both crewmembers. The result is a severe limitation in the information that can be displayed and, since the displays are configured based on the crewmember's role, competition between the crewmembers for use of the center display. A 19-inch diagonal display size is recommended by established researchers as being necessary for maintaining tactical situational awareness from the digital map displays. During indirect vision operations, the driver may need to see a full view of the driving scene as shown on the display to his front (via the center scene camera), and the center display and his wing display (via the left and right side cameras). That the commander is limited to his front and wing displays in this configuration severely limits his information access and furthermore may induce motion sickness from the driving scene on the center display.

For example, FIG. 1 is a top-view schematic of a two-person crew station 10 for a typical manned tactical vehicle operated with an indirect vision driving system. The crew station compartment 11 has two side-by-side seats 12, 13 facing forward with a discrete switch control panel 19 between them. The seats 12, 13 face an array of video display monitors 14-18 mounted to the immediate front of the seats 12, 13. The left seat 12 faces a left wing display monitor 14, a center display monitor 15, and the shared display monitor 16. The right seat 13 faces the shared display monitor 16, a center display monitor 17, and a right wing display monitor 18. In a typical configuration, the displays are in a portrait-orientation with a nominal arm-reach viewing distance. The wing-displays 14, 18 are rotated slightly inward so as to be normal to the viewing line of sight. The crewmembers operate the vehicle manually with hand and foot controls 21, 22, as well as with touch screen buttons and console switches (not shown), and speech through an automatic speech recognition system (not shown). Driving and tactical information are presented to the crew on the video display monitors 14-18 as well as audio and tactile displays. The video display monitors 14-18 are multifunctional showing the external driving scene, situational maps, and system status as selected by the crew based on their role and permissions. The video display monitors 14-18 are controlled by a video router (not shown) as part of a computer 23 with input of the immediate driving scene collected by video sensors 26 and the tactical position from a Global Positioning System (GPS) sensor 24, a tactical database received from a digital radio 25, and the control inputs from the crew.

FIG. 2 is a schematic of the video processing for the video display monitors 14-18 of FIG. 1. In one configuration, the indirect video sensors 26 comprise an array of forward facing analog video cameras 32-34: a left side view camera 32, a central view camera 33, and a right side view camera 34. In some designs, the video cameras 32-34 have analog video format output to computer 23, and power input line 36 from the vehicle power unit 30 via a voltage distributor 31 per the horizontal-synch and vertical-synch control lines 35 from the computer 23. The video output line 37 is input to image processing boards (not shown) of computer 23 that provide video capture, real-image processing, graphic overlay, and display of the live video in a graphics display window on the displays of the crew station compartment 11. The graphic overlay supports real time mission planning and operations decision making as directed by the computer 23. The processing boards provide video routing of both the scene images and the multifunctional displays to the video display monitors 14-18 of FIG. 1. FIG. 2 shows the video output line 38 to the video display monitors 14-18. The video display monitors 14-18 can be manually operated by touch screen buttons (not shown) that are displayed with legends, as well as bezel and contact switches (not shown) mounted about the display housing. More particularly, FIG. 2 shows an output from the touch screens of the video display monitors 14-18 to the data line 39 of the computer 23.

Again with reference to FIG. 1, with this crew station 10, the middle display monitor 16 is shared by both crewmembers with the crewmembers viewing the same displayed information. The result is a severe limitation in the information that can be displayed and since the video display monitors 14-18 are configured based on the user's role, competition between the crewmembers for use of the middle display monitor 16 results. For example, during indirect vision operations with external vehicle-mounted cameras, one crewmember may have the responsibility for driving the vehicle from the outside video scene that is seen on the video display monitors 14-18, while the other crewmember may be performing command-level planning operations from the tactical map and system status displays for both their vehicle and controlled robotic elements. In some situations, such as navigating on a winding back country road, the driver in, for example, seat 12, may need to see a full view of the driving scene as shown on the center display monitor 15 to his front (via the central view camera 33), and his left wing display monitor 14 and the middle display monitor 16 (via the left and right side view cameras 32, 34). In this configuration, the commander (in seat 13) is limited to his center display monitor 17 and right wing display monitor 18; furthermore, the visual flow of the driving scene on the middle display monitor 16 may distract him from his task and lead to motion sickness since his view of the scene is in conflict with his body motion. This is because he is seeing the view from the right side view camera 34 that is pointing opposite to the direction that he is looking. This effect can be particularly disturbing when driving with stereoscopic vision where the indirect vision cameras 32-34 are each stereo camera pairs, with field-sequential video returns seen by the driver on his displays through, for example, wireless stereoscopic video liquid crystal shutter glasses. While the driver sees a stereoscopic image of the driving scene on the center display monitor 15, the commander sees the shifted sequenced images as a badly out-of focused scene. In another situation, such as driving down a straightway, the driver may need no more than the center display monitor 15 to his front (for the central view camera 33) freeing the middle display monitor 16 for use by the commander. However, in approaching a turn-off the driver may again need the middle display monitor 16 for an increased field-of-view with three contiguous video display monitors 14-16 thereby interrupting the commander in his tasks.

Accordingly, an improved display system and method of display, which is capable of being used by multiple vehicle crewmembers without limiting each crewmember's vision, range of motion, and abilities to properly conduct their respective tasks would be beneficial.

SUMMARY

In view of the foregoing, an embodiment herein comprises a dual-image (i.e., controlled view) LCD for the shared display and an operating means for at least two crewmembers to independently operate the display using touch panel buttons, switches, or hand controllers. The display enables the simultaneous display of different information and visual content depending on the viewing direction. In this manner, two crewmembers can both use the same display at the same time for the display of information needed for different tasks. The crewmembers may operate the display using touch panel buttons, which in some designs occupy the display space along the sides. The same display button space will display different touch screen buttons to the two crewmembers based on their separate tasks.

To preclude erroneous switching across tasks, the display system may rely upon hand position sensors mounted on the users to determine the appropriate button activation following a hand touch with touch panel buttons. When both crewmembers try to activate the same button area, the display system uses a computer controlled priority scheme to control access to the screen buttons. The priority scheme activates an in-use warning to the crewmember performing the lower priority task. The priority could depend upon the ranks of the crewmembers, the importance of their tasks, and/or the corresponding task status and procedural scripts. Hand controllers are encoded with identification numbers unique to the user. The switching action depends upon the identities of the crewmembers, their task status and script, and the display cursor locations.

In one embodiment, a video display system for use by crewmembers in vehicles may include: a computer processor; a display monitor comprising a common display driver configured to provide separate virtual displays to at least two crewmember users, the virtual displays being visible to a respective user based on the an angle of view of the respective user; and one or more activators operatively associated with the users, wherein said display monitor is configured to be activated by said one or more activators of said users according to a user priority determination algorithm executed by said computer processor.

In another embodiment, a method of sharing a video display system by crewmembers in vehicles, said method comprising: using a display monitor comprising a common display driver to provide separate virtual displays to multiple crewmember, the virtual displays being visible to a respective user based on the an angle of view of the respective user, wherein said display monitor is adapted to be activated by one or more activators operatively connected to the users according a user priority determination algorithm executed by a computer processor operatively connected to said display monitor.

The embodiments herein allow the use of a display size that is sufficiently large for maintaining situational awareness, in a crew station configuration that has been developed in prior vehicle prototypes thereby reducing software development time and supporting standardization across vehicles and a possible reduction in training needs.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 17(A) is a schematic diagram of a crew-shared display with touch screen buttons according to an embodiment herein;

FIG. 17(B) is a schematic diagram of an autostereoscopic display with a parallax barrier design intended for use as a crew-shared display according to an embodiment herein;

FIG. 17(C) is a graphical representation of the luminance for the autostereoscopic display of FIG. 3(B) according to an embodiment herein;

FIG. 18(C) is a schematic diagram of a hand-locator using an infrared system according to an embodiment herein;

DETAILED DESCRIPTION OF PREFERRED EMBODIMENTS

Figure 1:
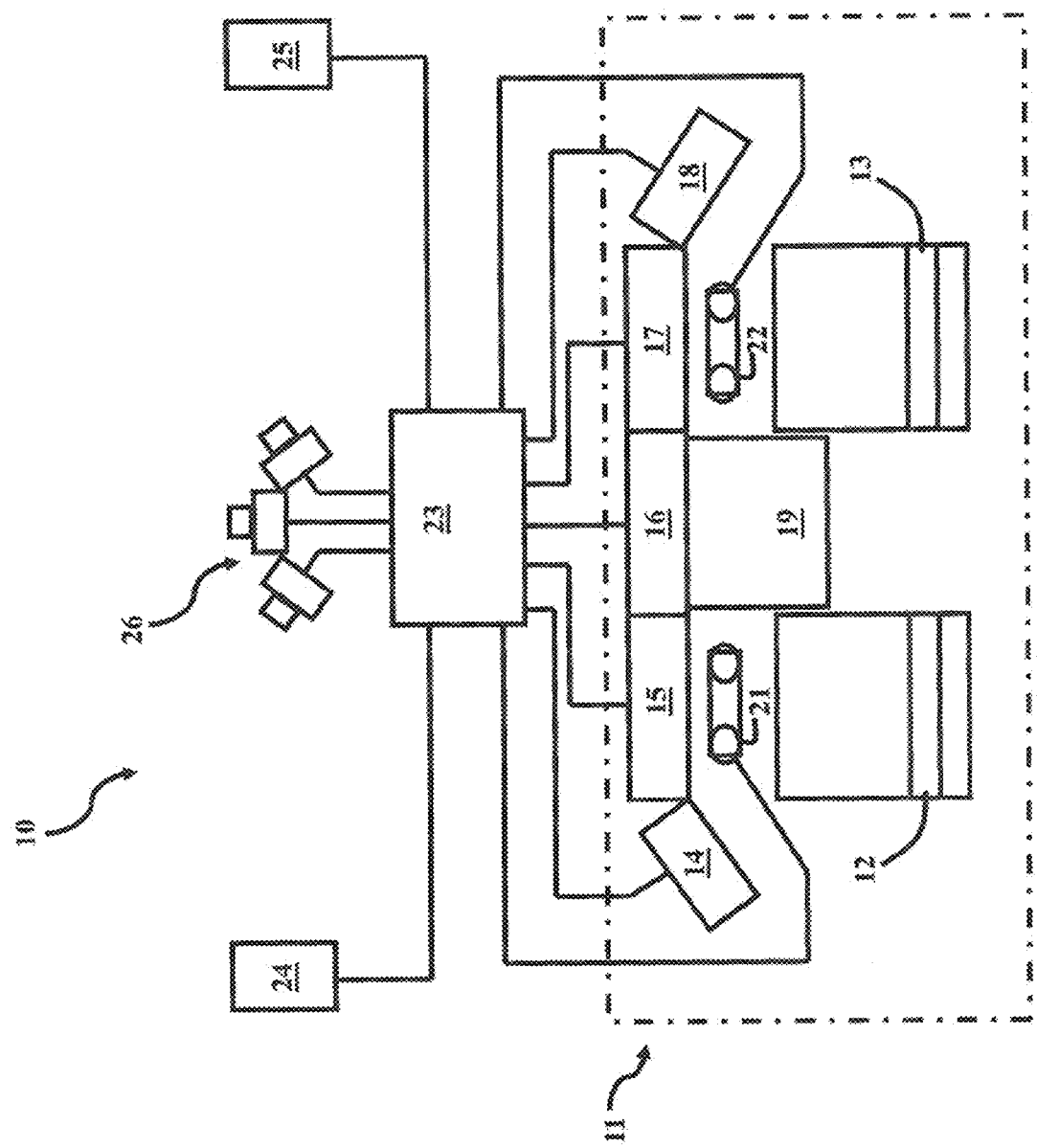
FIG. 1 is a top view schematic diagram of a crew station in a manned vehicle with an indirect vision driving system according to the conventional approach.

As mentioned, there remains a need for a display system and method for use in multiple crew means of transportation, such as a manned armored vehicle, which is capable of being used by multiple vehicle crewmembers simultaneously without limiting each crewmember's vision, range of motion, and ability to properly conduct their respective tasks. Embodiments of the invention achieve this by providing a shared video display system that provides separate virtual displays to multiple users from a common display monitor, and a means for independently interacting with the displays. Of particular interest is the operation of the displays via touchpanels in which the display buttons are in fixed locations. In this design, the operator need only move his hand toward the display button of interest from a memory of the display and peripheral vision leaving the foveal attention free for a concurrent task, then with a brief interruption, shift his foveal vision to guide a fixation cue into the display button before activating selection. This natural process allows the performance of concurrent tasks with minimal interference with foveal vision, an important advantage for driving and target location from video screens while activating discrete functions related to the task.

In the embodiments presented, the crew shared display is located to the side front of each crewmember and within the reaching distance needed to manually touch display buttons from the seated position; however, the developments need not be limited to that configuration. In still other crewstation designs, the displays may be disposed about the crewmembers within view but located beyond arm reach; this configuration affords more room for control access and flexibility in design. In one such example, the displays may surround the front view covering the upper, front, lower, and both side viewing directions; here, all displays may be dual image displays thereby affording a different image to each crew member on the same viewing surface. In this case, the displays may be operated virtually by finger pointing and with hand movements with any of the above hand tracking systems where both the hand and finger positions are tracked. The invention described herein is a product of our extensive research here at the Army Research Laboratory into the performance of prototype dual-image displays as determined from physical measurements of luminance and color chromaticity, subjective evaluations by human factor specialists, and crew station experiments. These results were used to guide our development of the invention, in particular a method for implementation of the invention mechanisms. To better understand the development of the invention, we first present the results of a study for an exemplary prototype dual image display monitor compared to single-image monitors.

Display Study Results

In development of invention, the inventor considered a display study as performed by our Laboratory, the results of which are briefly discussed below.

In particular, the study compares a prototype dual-image liquid-crystal display 19-inch 1280 by 1024 monitor, and two single-image liquid-crystal display monitors: a ViewSonic VX922 and a Dell E196FPB. These last two monitors were selected as being approximately equivalent to the base prototype monitor in terms of display parameters such as display size (19" dia.), native resolution (1280×1024), dot pitch (0.294 mm), color depth (16.2 M), brightness (270 cd/m$^2$), contrast ratio (500:1), video response time (2 to 8 ms), viewing angle range (140° to 160°), and update rate (75 to 76 Hz).

Display Monitor Luminance and Chromaticity Measurements

Figure 3:
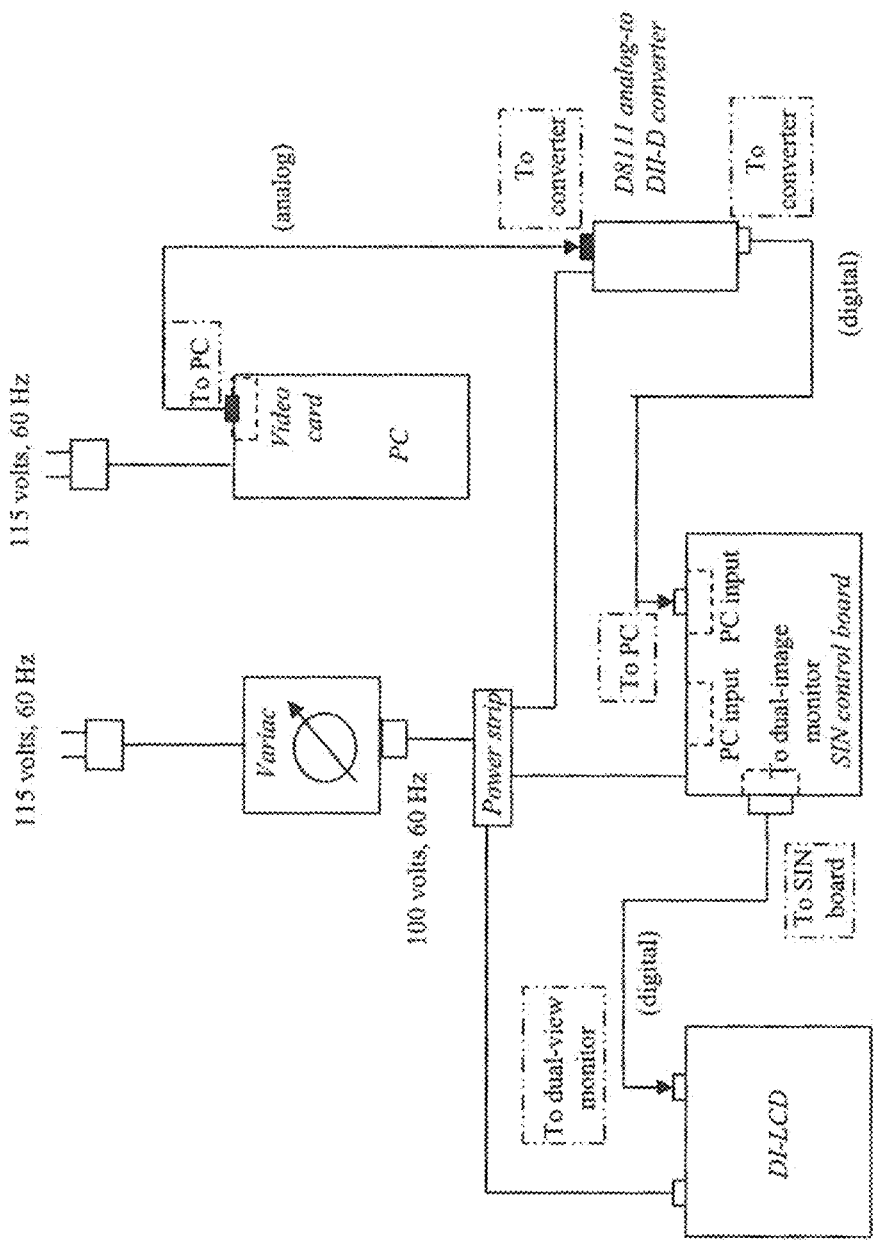
FIG. 3 is a schematic of the electrical connections via the signal integration controller (SIN) for a single view of the prototype dual-image display (DID) monitor used in the display study.

Measurement Procedure:

The display monitor luminance and chromaticity of both images of the DID monitor and the single images of the ViewSonic and DELL monitors were measured as a function of viewing angle with a Photometric Research PR-650 Spot Spectra colorimeter using a MS-75 accessory (cf., Kollmorgan Instrument Company, 1992). For this process the monitor was connected to the video output of a DELL computer (DELL PC Intel Pentium 4-CPU 1.70 GHz 523,280 KB RAM computer w/dual DVi video graphic card) and fixed in an upright position on a test table with a sighting aid aligned with the horizontal front of the display. The DID was interfaced to the computer through the Signal Integration (SIN) controller; see FIG. 3 for a schematic of the electrical connections. Prior to measurements, the display monitors were adjusted based on the manufacturer-recommended settings with the Windows' Display Properties set to 32-bit color, 1280 by 1024 pixel resolution, 96 DPI, and 60 Hz screen refresh rate for all monitors, and with the monitor brightness and color contrast at the manufacturer's factory settings.

For the physical measurements, the PR-650 colorimeter on a tripod stand in front of the monitor stand was positioned at different viewing angles as located by the sighting aid with the sighting distance held constant at 17-inches; the focus distance of the PR650 with the MS-75 accessory is 14-inches or greater and the spot size is 5.25 mm. The vertical sighting angle was set normal to the screen surface as determined by the stand height and the horizontal distance to the sighting point. The measurements were in a completely darkened room to preclude display surface reflections; the only illumination was from the monitor screen and that reflected back to the display surface from the surrounding room was 0.42 lux. Because LCD's typically vary slightly in brightness across the screen, brightness readings were taken from the same location on the display. The colorimeter was focused on a central white or colored square patch located on DisplayMate checkerboard test screens (DisplayMate image quality test software, DisplayMate Technologies Corporation, 2003); the same display patch was used for all monitors. The ANSI Contrast screen was used to measure the white color; the Standard Colors screen was used for the Red, Green, and Blue colors. Dark Gray from the Dim Colors screen was used in place of Black to determine brightness contrast ratio since no reading occurred with the black color.

Results:

The luminance and color chromaticity measures were statistically analyzed by display monitor over the useful viewing range of −20° to +20° (in 5° increments), about the central viewing angles of 25° to the surface normal for the DID, a 0° normal for the ViewSonic and DELL, and a 25° to the normal for a ViewSonic-offset for comparison to the DID.

Figure 4:
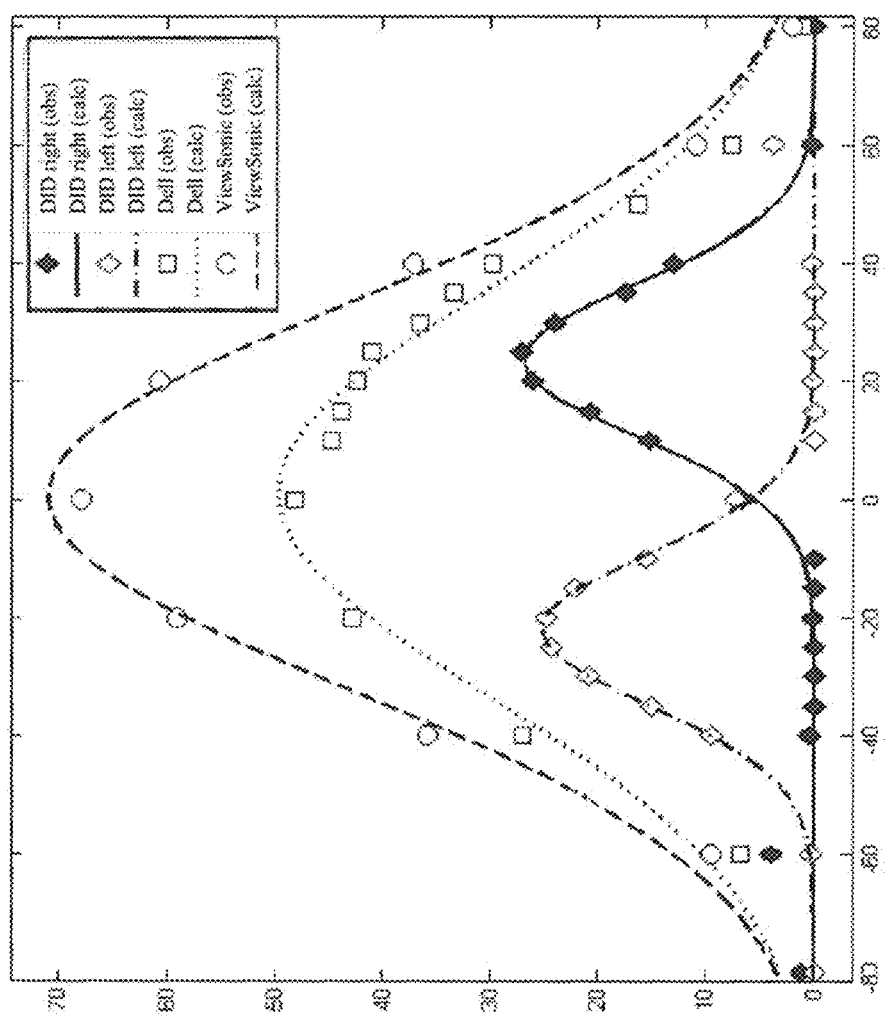
FIG. 4 is a plot of White color luminance for the ViewSonic, DELL, and prototype DI (left and right side on separately) display monitors used in the display study, as a function of viewing angle.
Figure 5:
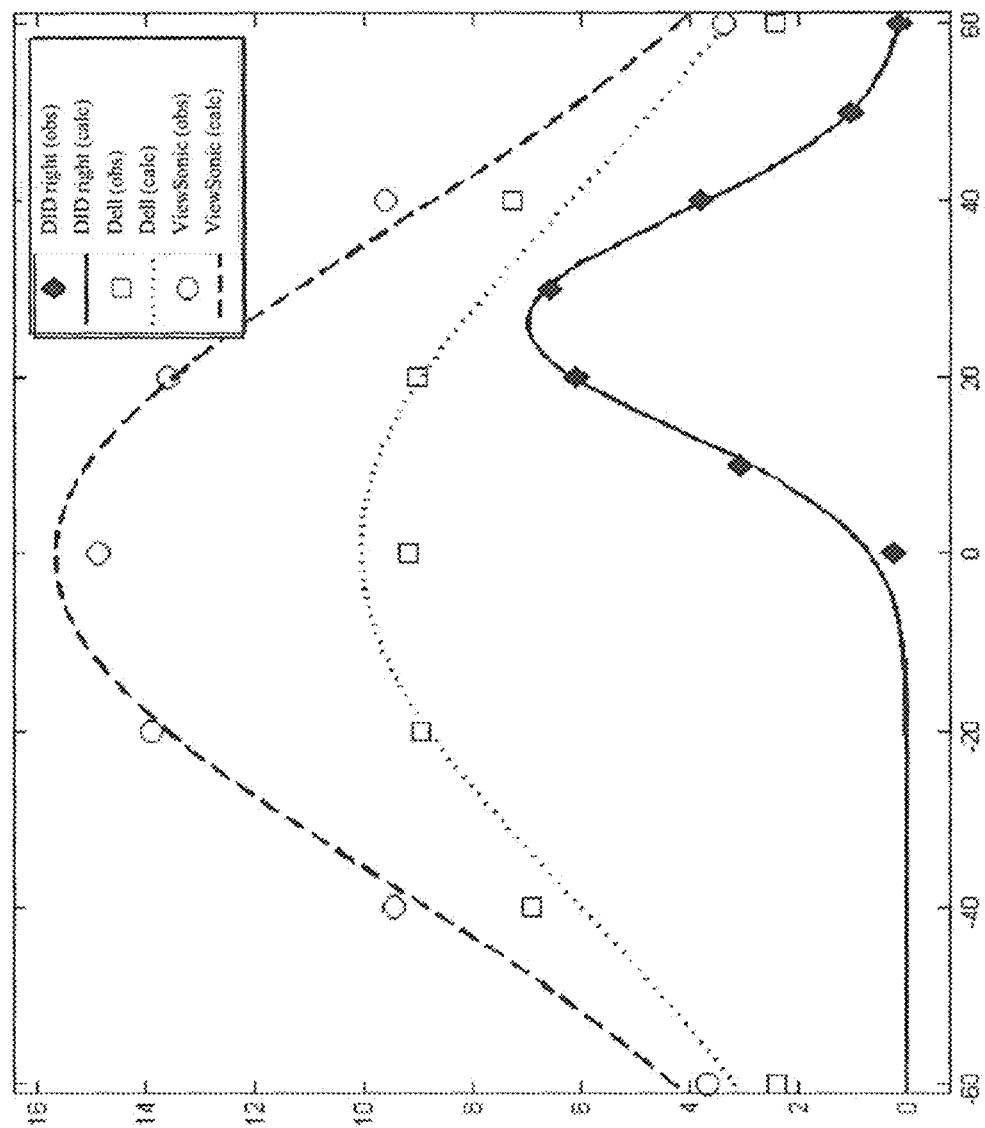
FIG. 5 is a plot of Red color luminance for the ViewSonic, DELL, and prototype DI (right side on only) display monitors used in the display study, as a function of viewing angle.
Figure 6:
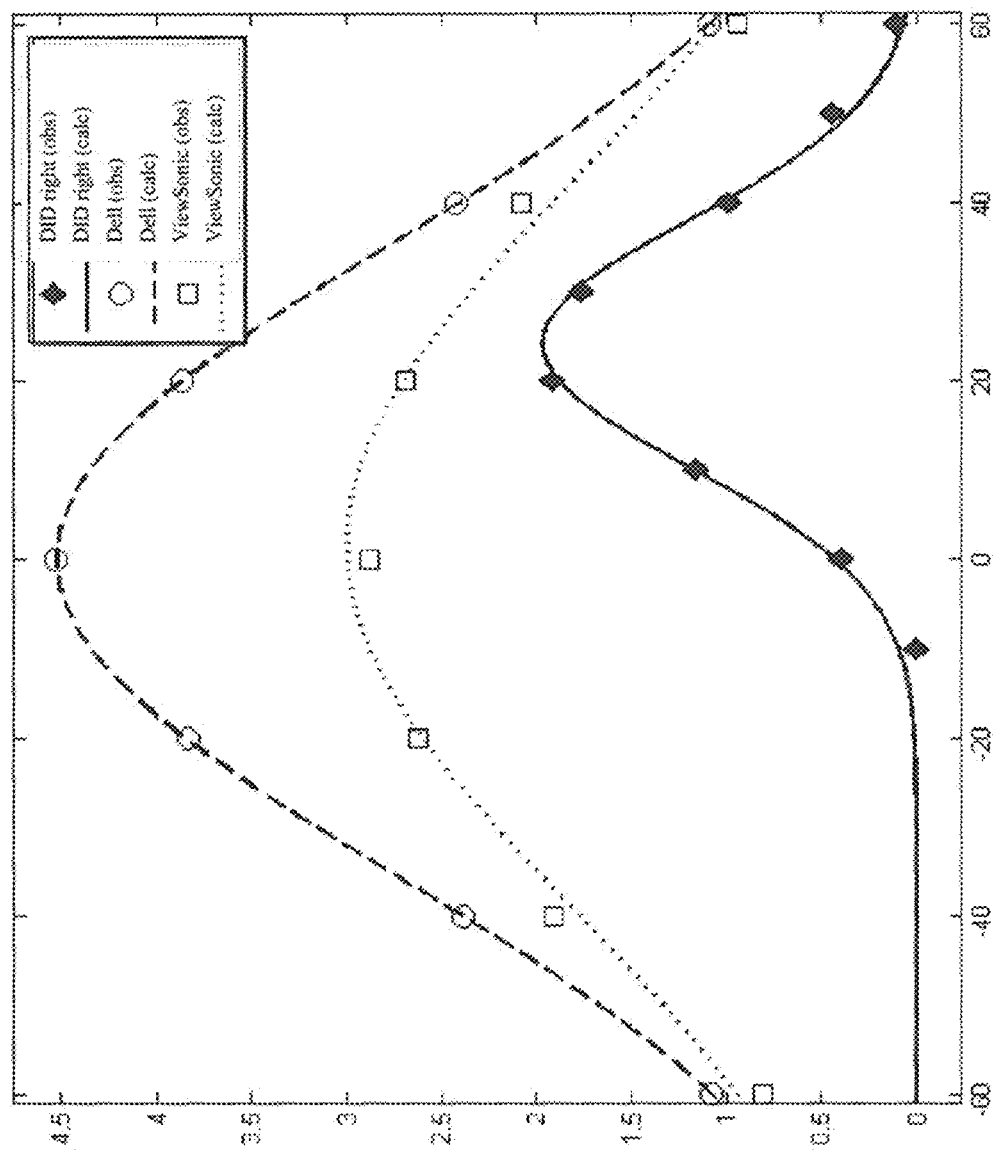
FIG. 6 is a plot of Blue color luminance for the ViewSonic, DELL, and prototype DI (right side on only) display monitors used in the display study, as a function of viewing angle.
Figure 7:
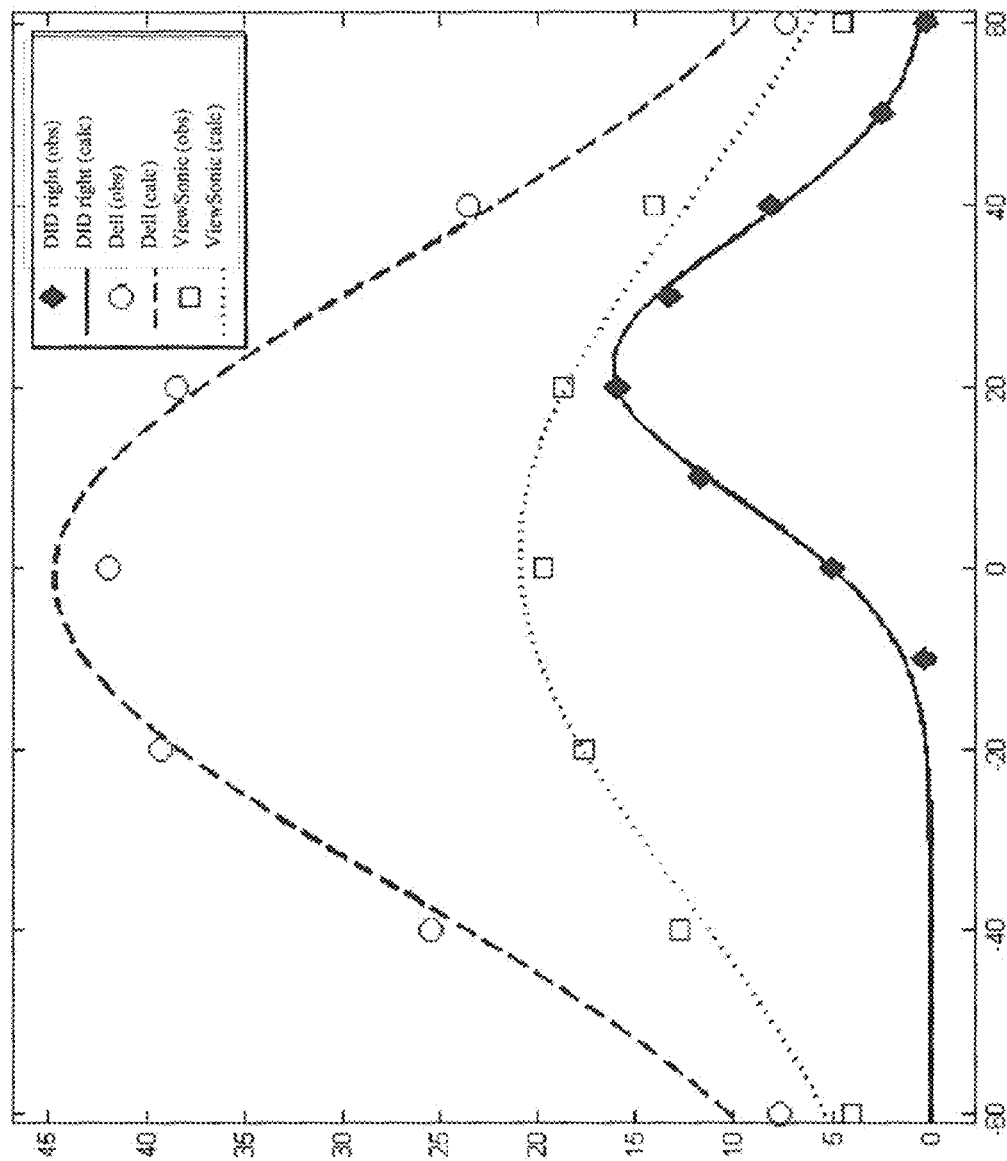
FIG. 7 is a plot of Green color luminance for the ViewSonic, DELL, and prototype DI (right side on only) display monitors used in the display study, as a function of viewing angle.

Luminance:

A multivariate analysis of variance test shows significant differences among display monitors (Wilks' Lambda=0.030, F=8.669, df=12, dfe=37.332, p=0.000) for the luminance of the White and primary Red, Blue, and Green colors. Pairwise comparisons show that the luminance of the white and primary colors is significantly different for all monitors. FIG. 4 shows plots of the White color luminance for the ViewSonic, DELL, and DID display monitors as a function of viewing angle, with the left and right view of the DID on separately. FIGS. 5, 6, and 7 show similar plots for the Red, Blue, and Green color luminance respectively, with only the right view of the DID turned on. Considering the DID, the luminance plot for the right and left views together is symmetrical about the normal viewing direction; for the right view, the luminance plot peaks roughly about 25-degrees and falls off to either side reaching minimal values beyond −10° in one direction and 60° in the other direction. For the ViewSonic and DELL, the luminance is symmetrical about the normal viewing direction, peaks at the normal viewing angle (0°), and falls off to either side.

Because the optimal viewing angle for the tested displays, and in particular for the DID display, was not a priori known, measurements of display luminance could not be optimized to the factory-defined viewing angle for maximum luminance. Therefore, to improve the estimates for these values, Gaussian fits were applied to the measured luminance data as a function of viewing angle for each display and color. A Gaussian fit was used as its parameters are easily interpretable in terms of the measures of interest: the value at the "mean" of the fitted curve, a1, can be interpreted as the maximum luminance, and the location of "mean" of the fitted curve, b1, can be interpreted as the viewing angle at maximum luminance: $f(x)=a1*\exp(-((x-b1)/c1)^2)$. Results of these analyses are presented in FIGS. 4-7.

Figure 8:
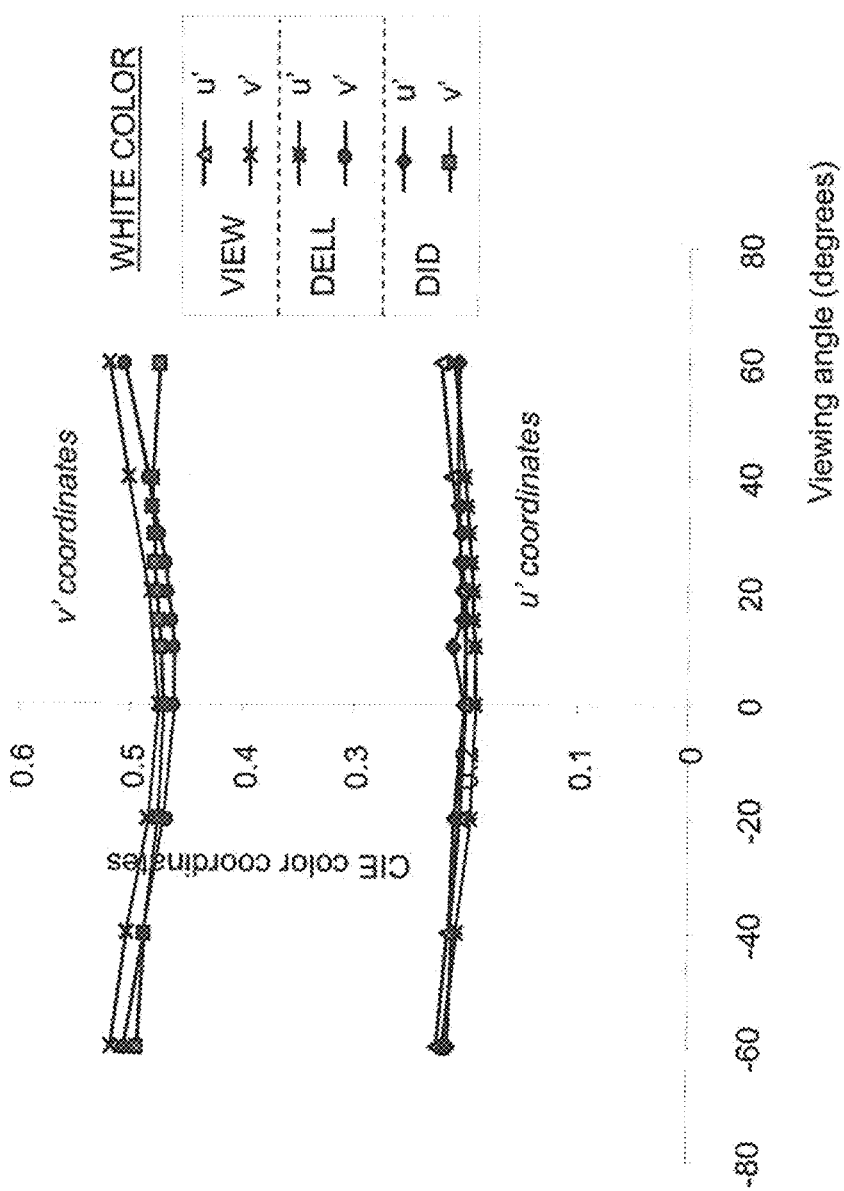
FIG. 8 is a plot of the White color CIE coordinates for the ViewSonic, DELL, and prototype DI (left and right side) display monitors used in the display study, as a function of viewing angle.
Figure 9:
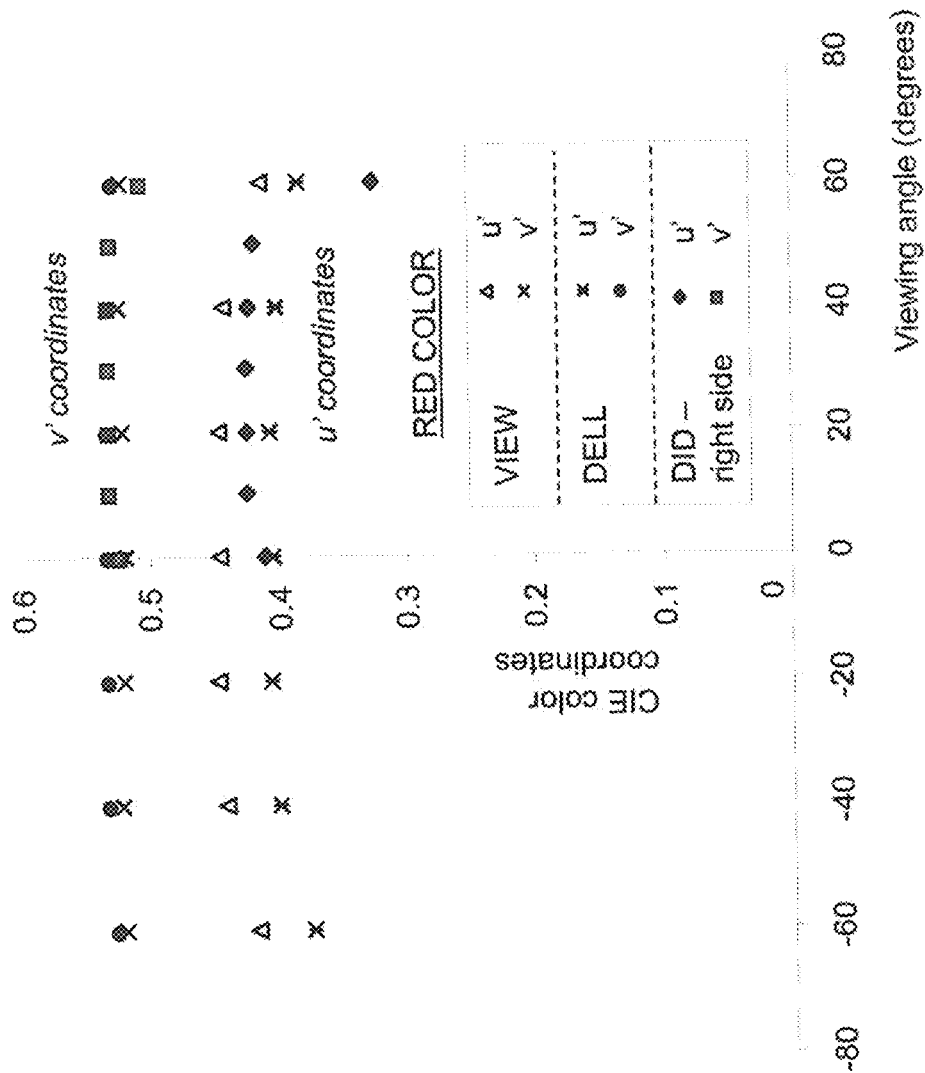
FIG. 9 is a plot of the Red color CIE coordinates for the ViewSonic, DELL, and prototype DI (right side) display monitors used in the display study, as a function of viewing angle.
Figure 10:
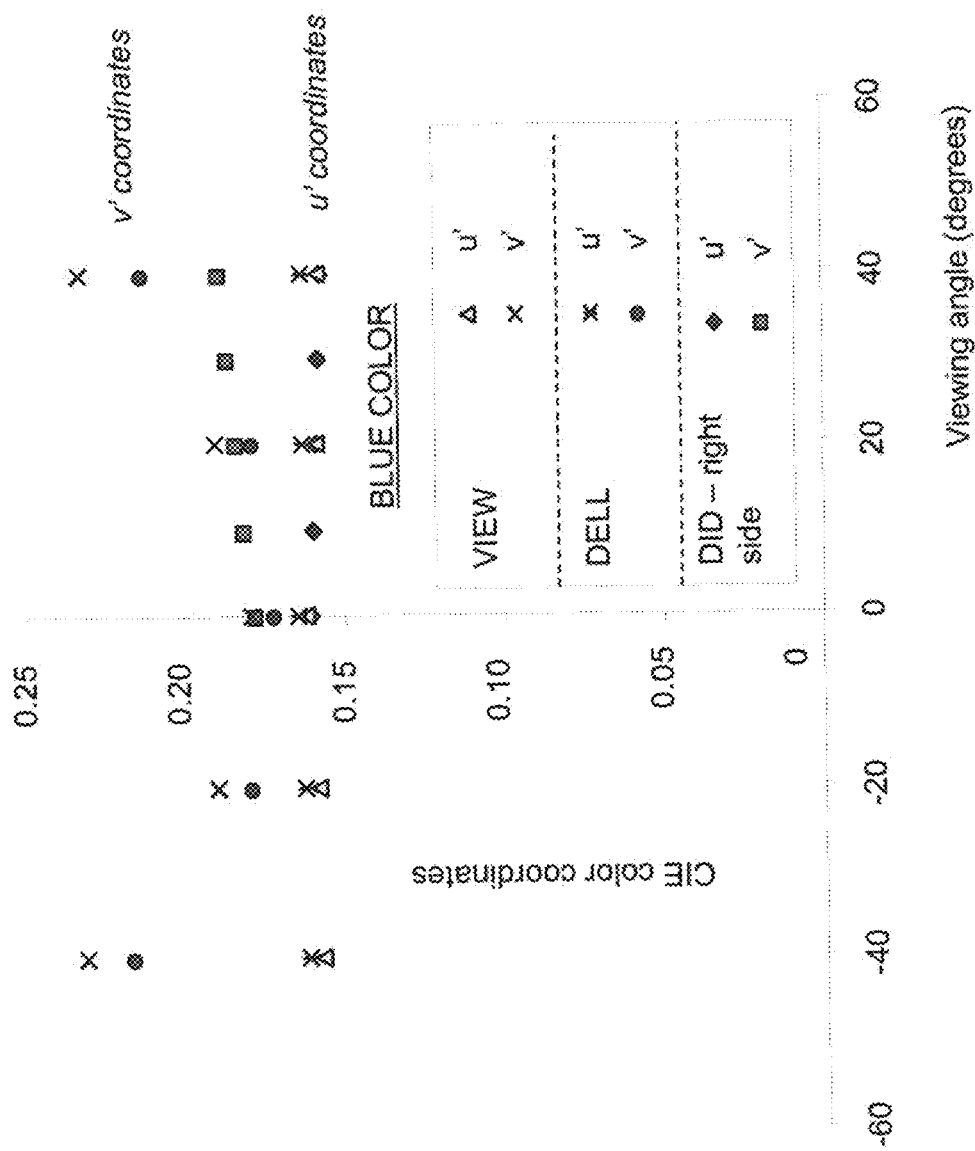
FIG. 10 is a plot of the Blue color CIE coordinates for the ViewSonic, DELL, and prototype DI (right side) display monitors used in the display study, as a function of viewing angle.
Figure 11:
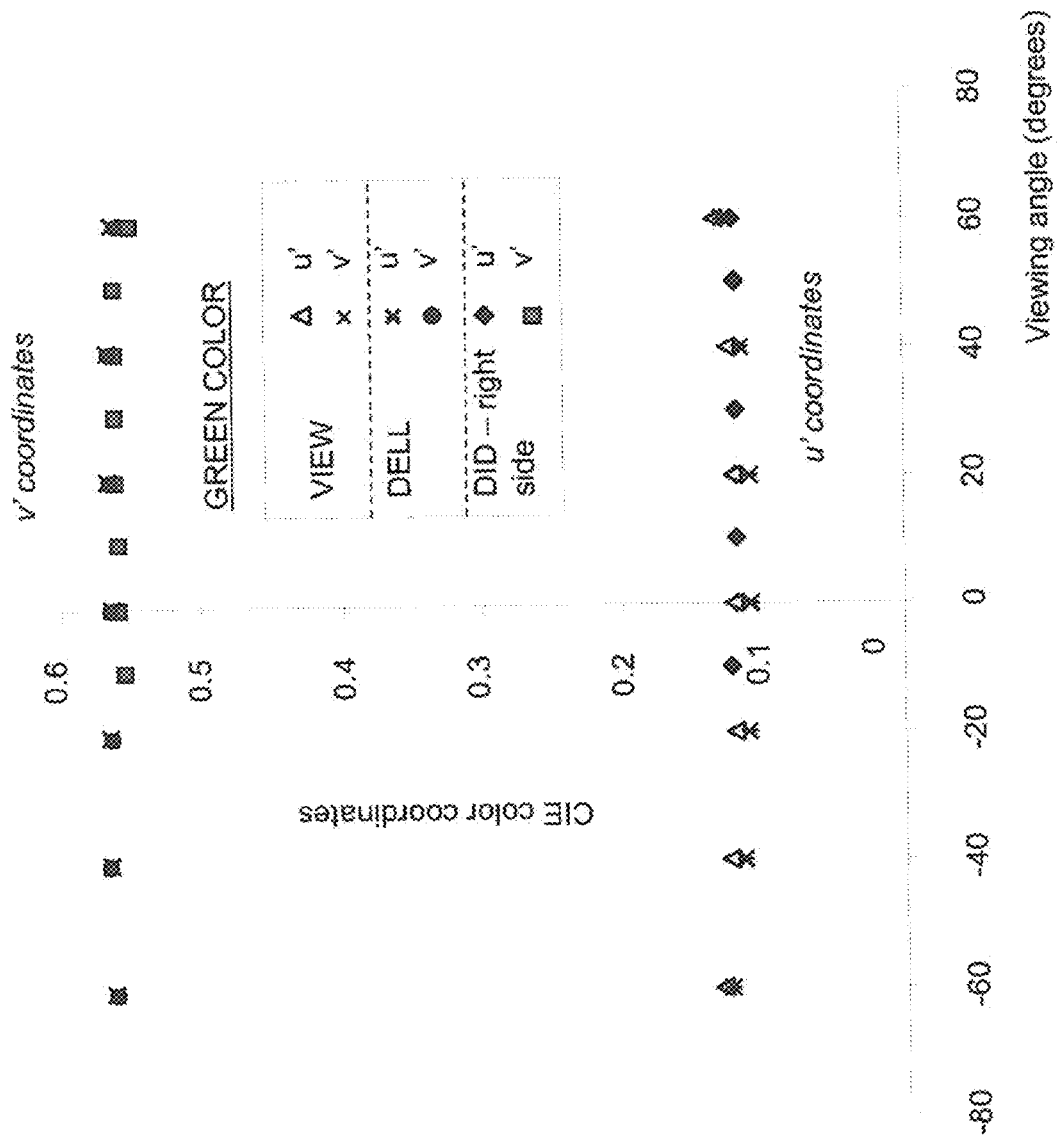
FIG. 11 is a plot of the Green color CIE coordinates for the ViewSonic, DELL, and prototype DI (left and right side) display monitors used in the display study, as a function of viewing angle.
Figure 12:
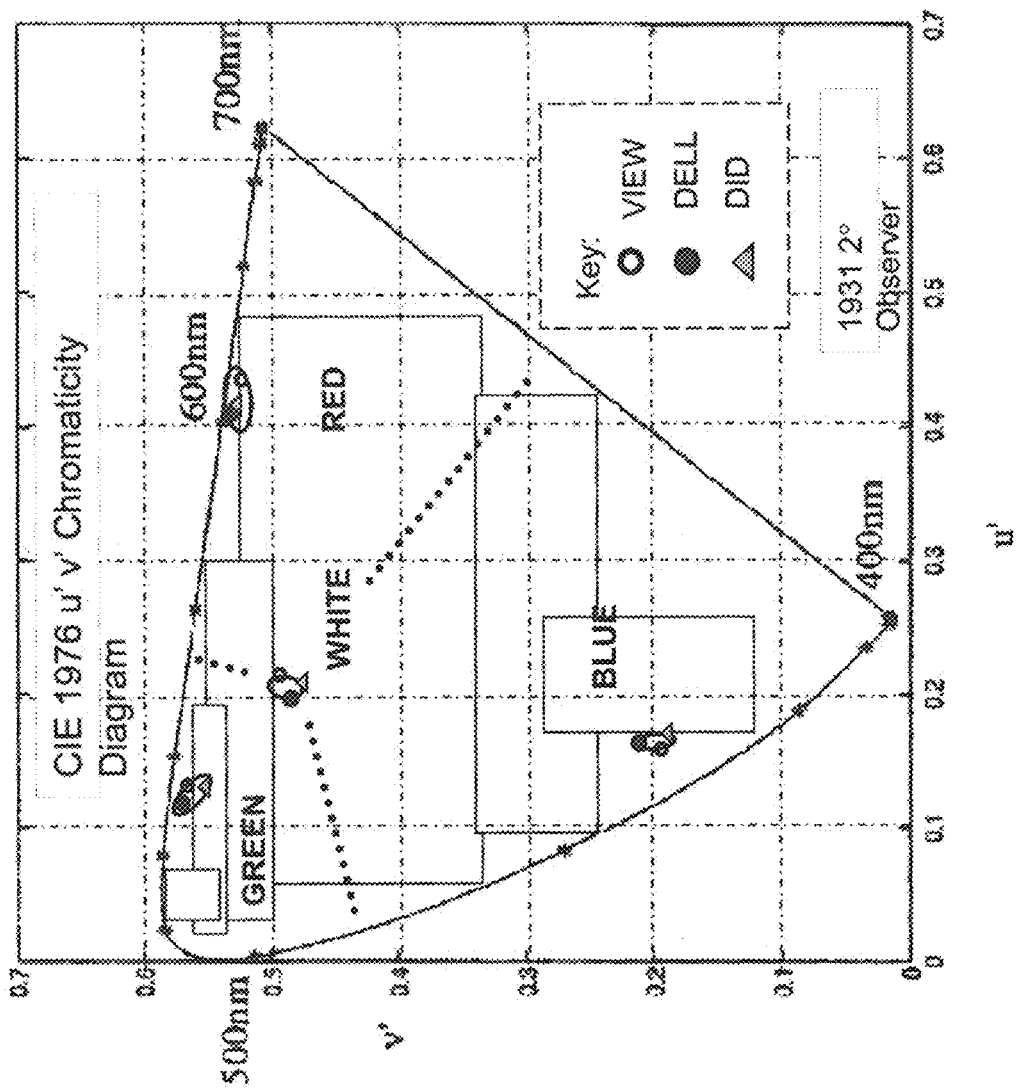
FIG. 12 is a CIE 1976 u' v' Chromaticity Diagram plot of mean color coordinates for the White, Red, Blue, and Green of the ViewSonic, DELL, and prototype DI display monitors used in the display study, along with the corresponding just noticeable color difference (10×'s) ellipses.

Chromaticity Coordinates:

A multivariate analysis of variance test shows significant differences among display monitors (Wilks' Lambda=0.000, F=54.512, df=24, dfe=73.109, p=0.000) for the International Commission on Illumination (CIE) chromaticity u', v' coordinates; a test of between effects shows this is true of the White and primary Red and Green colors, but not the Blue. Pairwise comparisons show that the color coordinates for the DELL are significantly different from those for the other displays for all but the Blue color which are insignificantly different for all displays. FIG. 8 shows plots of the White color CIE u' and v' coordinates for the ViewSonic, DELL, and DID (right view on only) display monitors as a function of viewing angle. FIGS. 9, 10, and 11 show similar plots for the Red, Blue, and Green color CIE u' and v' coordinates respectively. Application of a linear regression analysis shows no significant linear dependency of the CIE color coordinates with viewing angle; only the model constant is significant. This is true except for the blue v' coordinate on the DID, which statistically has a strong linear component with however a minimal slope. Finally, FIG. 12 is a CIE 1976 u' v' Chromaticity Diagram plot of mean color coordinates for the White, Red, Blue, and Green colors of the ViewSonic, DELL, and DID, along with the corresponding just noticeable color difference (10×'s) ellipses for reference. Note that the tabulated color coordinates are within or close to the radius of the allowable circular area for the chromaticity coordinates specified as standard for use on a control panel in military vehicles per MIL-STD-3009 (DoD, 2001).

Brightness Contrast:

The brightness contrast was computed from the ratio of the white and gray luminance measurements. A univariate analysis of variance test shows significant differences among display monitors (F=132.41, df=3, dfe=18, p=0.000) for the brightness contrast; pairwise comparisons show that the brightness contrasts for all monitors are significantly different except those for the ViewSonic at normal and offset viewing. For the DID (right view), while the brightness contrast tends to follow the luminance peaking at about 25-degrees, the contrast is relatively uniform (19.74+/−1.82) over the central portion of the viewing range from 15° to 35°. Similarly for the ViewSonic, the brightness contrast tends to follow the luminance peaking at the normal viewing angle, but is relatively uniform (9.78+/−1.88) over the central portion of the viewing range (−40° to) 40°. Again, for the DELL, the brightness contrast tends to follow the luminance peaking at the normal viewing angle, but is relatively uniform (5.74+/−0.78) over the central portion of the viewing range (−40° to 40°).

In summary, the measurements show reduced luminance for the DID compared to the ViewSonic and DELL monitors at the side viewing angles for the white, red, blue, and green colors. There is little difference in the color chromaticity coordinates for the three monitors and all are relatively consistent across viewing angles. Although there are differences in the brightness contrast among the monitors, the contrast is relatively consistent across the viewing range and the differences may be due to the difficulty in measuring the dark color luminance.

Subjective Evaluation of Display Monitors

Procedure:

Human Factors subject matter experts rated the image quality of the DID display monitor; in particular, the screen distortions and the effects of the screen resolution on the text readability, recognizability of symbols, and line clarity. The quality of a display image is an overall measure dependent on such properties as brightness, contrast, gray and color scales, geometrical uniformity, isotropy, and distortion, raster aliasing and interference, flicker or update rate, sharpness, clarity, resolution, resolving power, acuity, and acutance to name several (Biberman, 1973). The image distortions in sharpness, grayscale, color scale, and uniformity were evaluated subjectively using the various DisplayMate (DisplayMate Technologies Corporation, 2003) Visual Obstacle Course and Turn-up programs such as the Geometry and Distortions, Sharpness and Resolution, Color and Gray Scale, by scanning the program displays looking for changes in the patterns over a range of viewing angles. The readability of text was rated as a function of font size (7 to 12) as presented in New Roman Text in a Word document, the recognizability of simple figures (circle, triangle, cross, cross rotated) in a Power Point Presentation as a function of figure size (0.065" to 0.25"), and the clarity of a line in a Power Point presentation as a function of orientation angle from the horizontal (0° to 90°). The ratings were made for viewing angles from 0° to 40° in 10° increments, at a 20-inch distance, and the text, figures, and lines were drawn in black against a white background.

Results:

There were no noticeable distortions in the test patterns at any of the viewing angles for all monitors. For the text readability, symbol recognizability, and line clarity, separate univariate analyses of variance show significant differences among the monitors for the readability of the text (F=90.78, df=2, dfe=78, p=0.000), recognition of the symbols (F=23.50, df=2, dfe=64, p=0.000), and line clarity (F=11.39, df=2, dfe=64, p=0.000). Because of the increased resolution, the text is more readable, the symbols are more recognizable, and the lines have greater clarity on the ViewSonic and DELL than on the DID because of the reduced resolution due to the filtering process. While these results are independent of viewing angle for the DID, the data shows a decrease in the ratings with increased viewing angle at the smaller fonts and symbol sizes for the ViewSonic and DELL, but this is not so by line orientation. As would be expected, the small font text is significantly less readable, the small symbols less recognizable, and the lines tilted from the horizontal have less clarity on all monitors. While the font size of 12 or 11 was rated legible for the DID this is less true of fonts size 10 or smaller; a ¼ inch symbol was easily recognized but this is less true of symbols ⅛ inch or smaller; a line at a 60° degree angle to the horizon appeared broken jagged because of aliasing while a vertical line appeared twice as thick. For the ViewSonic, the font size of 10 or 9 was legible, a ⅛ inch symbol was easily recognized, and a line at an angle appeared only slightly jagged. Similar comments apply to the DELL.

In summary, Although there are no noticeable distortions in the test patterns for all monitors across viewing angles, the smaller text is less readable, the smaller symbols less recognizable, and lines have less clarity on the DID than the ViewSonic or DELL.

Subjective Comparison of Display Monitors

Figure 13:
FIG. 13 is a left side view of crew station setup for human factors evaluation with prototype dual-image display monitor (third from left) used in the display study.
Figure 14:
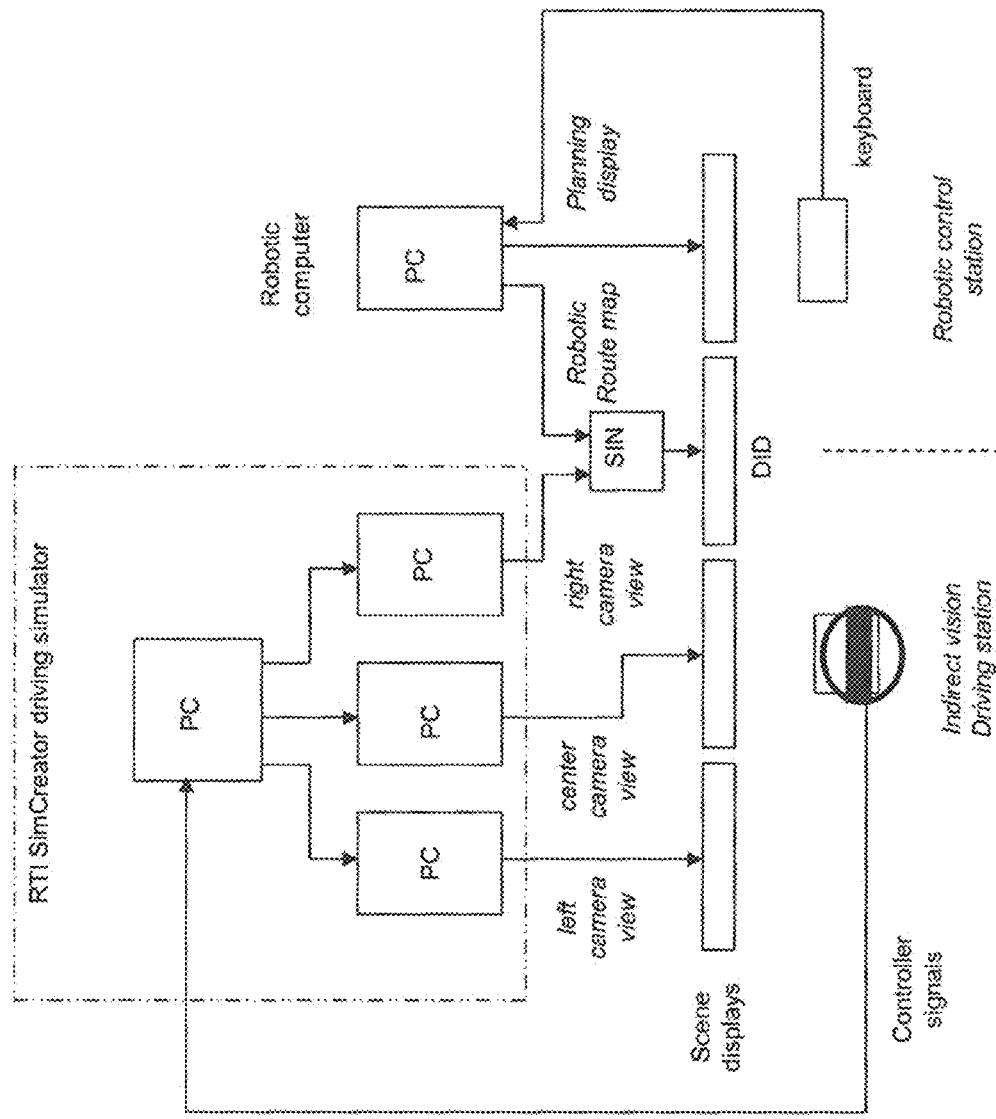
FIG. 14 is a schematic of crew station configuration used in the driving simulator exercise.

Procedure:

Ten human factors specialists with 20/30 or finer (corrected) vision and human factors expertise evaluated viewing angles for the DID monitor in two different tasks, and compared the image quality to those of the single-image monitors for the quality measures of sharpness, resolution, brightness, contrast, acuity, color scale, distortions, and flicker (Biberman, 1973). In this process, following familiarization with the two task displays: a vehicle driving simulator scene and digital map, the specialists rated the preferred viewing angles and overlap for both the driving scene and map display images on the DID from both standing and sitting positions, rated image quality measures for both the DID and regular LCD for the two task displays, and then rated their display preference for the tasks. Subjective rating of image quality measures for DID and regular LCD used an 8-point (0 to 7), bipolar rating scales anchored at the ends by the verbal descriptors of "poor" and "excellent." Preference rating comparing image quality measures of DID and regular LCD used a 7-point (3 to 0 to 3), bipolar rating scales anchored at the ends by the verbal descriptors of "DID" and "LCD." FIG. 13 shows a left side view of the crew configuration stations used in the subjective comparison with the DID being the third display from the left.

Results:

The results for the DID viewing angles, image quality ratings for the monitors, and display preferences follow; included also are comments by the evaluators. A multivariate statistics test was applied to the viewing angles as dependent variables with the viewing position and side as treatments, separate paired t-tests are used to analyze significance between the viewing angles; a multivariate statistics test was applied to the image quality ratings with the displays as treatments; and separate one sample t-tests (test value 0), were applied to the display preference ratings, following conversions of the DID ratings to negative numbers for analysis.

DID Viewing Angles:

A multivariate statistics test shows no difference for the absolute values of the viewing angles by position (standing or sitting), side (left or right), or the position by side interaction. A paired sample means t-test applied to the absolute values shows significant differences between the maximum acceptable and the preferred view (df=39, t=−8.693, p=0.000), between the preferred view and the minimum acceptable (df=39, t=5.285, p=0.000), and between the minimum acceptable and the overlap angle (df=35, t=4.554, p=0.000).

Image Quality:

A multivariate statistics test (Wilks' Lambda=0.166, F=5.271, df=16, dfe=58, p=0.000), shows that the image quality ratings of the DID are significantly less than those of the ViewSonic for the driving scene, and significantly less than those of the DELL for the map display, but there is insignificant differences between those of the ViewSonic and DELL. The sharpness quality rating of the DID view for the driving scene is significantly greater than that of the DID view for the map display, but no difference between the DID views for the remaining measures. The update rate shows no differences by displays. The descriptive statistics for all measures except the update rate of the ViewSonic and DELL combined are mean: 6.60, and standard error: 0.053. The statistics for the sharpness of the DID image for the scene are mean: 4.40, and standard error: 0.306; and for the DID image of the map are mean: 6.50, and error: 0.224. The statistics for all other measures of the DID except the update rate are mean: 6.472, and error: 0.120. The statistics for the update rate for all displays are mean: 6.472, and error: 0.120. The ratings for the ViewSonic in side view (30° offset) for the driving scene, are similar to those for the front view except that the mean rating for the brightness is reduced from 6.6 to 5, which is greater than that for the DID.

Display Preference:

A multivariate statistics test shows no difference in the preferences by task station, either driving scene or map display. A one sample means t-test (test value 0) shows significantly more preference for use of the ViewSonic with the driving scene or the DELL with the map display than the DID with either, on all image quality measures except the display update. The descriptive statistics for all ratings combined except the update rate, are mean: 2.270, and standard error: 0.123; those for the update rate are mean: 0.400, and standard error: 0.306. The preference with the ViewSonic in side view (30° offset) for the driving scene, is similar except that the mean rating for the brightness is reduced from 2.6 to 2.

Comments:

Most specialists reported that the DID was acceptable for driving but that they preferred the regular LCD for the robotic station because of the increased brightness, crisp colors, and resolution of details, especially for reading text. The specialists reported that the image on the DID was not as sharp and had lower image quality than the ViewSonic and DELL displays. On the DID, there was a slight overlap in one image from the high contrast regions of the other image resulting in a ghost image at the greater angles. The DID should be brighter with higher contrast since the maps and pictures on the robotic task are dull and lack clarity. Most reported that while the DID was acceptable for driving, it was more difficult to distinguish object details in the driving scene. On the graphics displays, straight lines appeared jagged. One specialist reported seeing vertical lines in the display and several reported that smaller, unbold text on the map display seemed distorted, blurry, and interrupted. One reported that while the text was legible on the DID, it took more effort since he could not just glance at the text but needed time to focus to read. For this reason, a larger, bold font should be used with the DID. It was suggested that the DID be used for the larger font size text files.

In summary, the results show that there is a definite viewing range for the DID that is preferred by a user. However, both the rating results and the comments show that while the DID would be acceptable for indirect vision driving, the use for a map display would be limited to the larger symbols and text fonts. The ViewSonic and DELL would be preferred because of the brighter and crisper images. Ghost images of the higher contrast map displays were noticeable in the driving scene at the far viewing angles.

Crew Station Exercises

Eight DOD human factors specialists with 20/30 or finer (corrected) vision and human factors expertise participated in a subjective evaluation of the effects of the prototype dual-image display on task performance in a crew station configuration. Because of the novelty of the DID, the specialist was encouraged to participate in a rigorous exercise involving first familiarization with the equipment and tasks, and then operate the equipment in a controlled scenario before conducting his or her evaluation.

Figure 15:
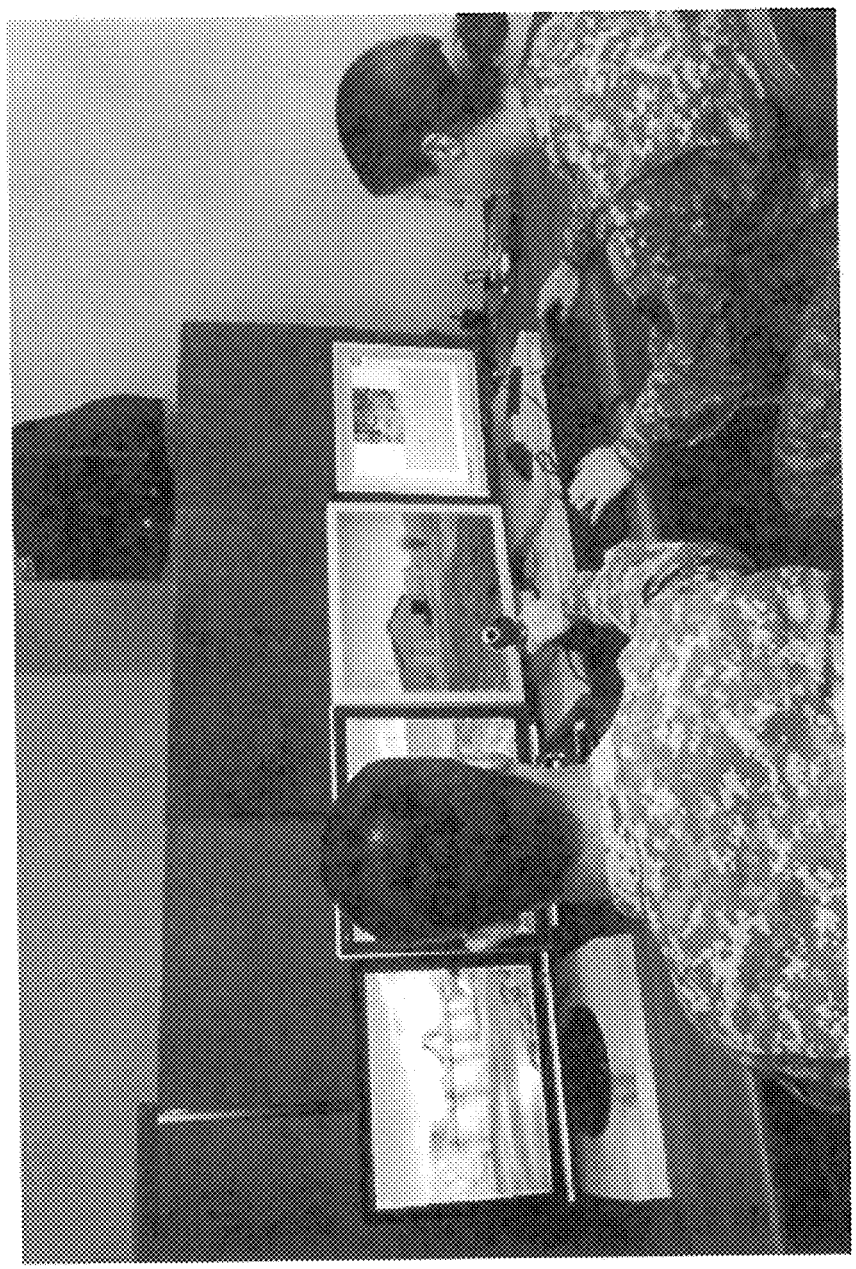
FIG. 15 is a left side view of crew station setup for driving simulator exercise with prototype dual-image display monitor (third from left) used in the display study.

Apparatus:

FIG. 15 is a schematic of the crew station configuration used for the display evaluation. The left side forms a driving station consisting of the RTI SimCreator driving simulation computers and three displays, a Samsung 17-inch wing display (Samsung 731BF [2 ms 2000:1] 17-inch 1280 by 1024 liquid-crystal display monitor) on the left, a ViewSonic 19-inch station center display (ViewSonic VX922 19-inch 1280 by 1024 regular-view liquid-crystal display monitor), and the Prototype DID on the right. The three displays show the left camera view, the center camera view, and the right camera view for an indirect vision driving system as seen from the graphics of the driving simulation program. The station is operated with a joystick controller for steering, accelerating, and braking. The SimCreator driving simulation program is a product of Realtime Technologies, Inc. The program is a graphical, hierarchical, real time simulation and modeling system. The programmer can choose and connect components to build models of vehicles and the terrain in a power flow modeling approach through a graphics users interface. For this study, the driving simulation program was based on an "Iraqi village" with streets, buildings, occupants, and other vehicles, along with the driving simulator vehicle.

The right side of the crew station forms a robotic planning station based on the RoboticNCO program and consists of a DELL PC and the shared DID on the left and Dell 19-inch station center display (Dell E196FPB 19-inch 1280 by 1024 regular-view liquid-crystal display monitor). A wing display was not used at this station. A robotic route digital map was shown on the DID and a scheduling control menu on the center display. The RoboticNCO program is a simulation developed for use on a PC for examining issues related to human supervision of Army robotic assets and automation.

The simulation has three main tasks: monitoring of an unmanned ground vehicle, unmanned aerial vehicle sensor use, and multi-level communications. The program incorporates a digital map with the position and types of sensor target returns marked by icons. The station uses a keyboard and mouse to interact with the program.

In this configuration, the left view of the DID is of the right hand driving scene via the DID-SIN from the driving simulator and the right view is of the robotic route map via the DID-SIN from the dual DVi graphics card of the PC. The equipment, software and crew station configuration are the same as that used in the display comparison reported above. FIG. 15 shows a left side view of the crew configuration station setup with the DID being the third display from the left. In this evaluation, the View-Sonic 19-inch and the Samsung 17-inch were interchanged to ensure equal sizes for the side displays at the driving station. Questionnaires: The specialist was encouraged to complete workload and motion sickness evaluations in a format provided by standard questionnaires of the NASA Task Loading Index (TLX) perceived workload questionnaire (Hart & Staveland, 1988), the Gianaros et al. questionnaire for the subjective estimation of motion sickness (Gianaros, Muth, Mordkoff, Levine, & Stern, 2001), and the Kennedy Simulator Sickness Questionnaire (Kennedy, Lilienthal, Berbaum, Baltzley & McCauley, 1989) for oculomotor symptoms.

Procedure:

The specialist was first familiarized and then performed the driving task and then the map task. For both tasks, the specialist performed the task first on one display and then on the other, either the dual-image display (DID) or the regular LCD display appropriate for the task. In the driving task, the specialist drove the same road turns either in the clockwise direction for the DID or in the counterclockwise direction for the regular display. This was done so that the driving turns would be seen in the display being evaluated. In the map test, two maps were used in the same sequence. For this reason, the exercise treatments were only counterbalanced by the displays but not the tasks nor the task elements. This was done because the time available to conduct the evaluation was limited to under a week. In this test, ambient lighting was set at a representative armored vehicle cab level; specialists were given time for light adaptation.

Following briefing by the research coordinator, the specialist was introduced to the dual-image display DID monitor and then familiarized with the vehicle simulator and robotic map display tasks. The specialist familiarized himself with motion sickness and workload questionnaires. The specialist then selected preferred viewing angles for the left and right views of the DID. The specialist was then introduced to the joystick controller for the driving task and allowed to operate the same, and then practicing driving the simulated vehicle along a familiarization course until satisfied with the control. The specialist next completed the questionnaires, was introduced to the town map, and again practiced driving the familiarization course while performing the additional task of reporting people and vehicles during the exercise. Following this familiarization, the specialist then recalled the sightings and plotted the same on the town map and then rated the workload and motion sickness in accordance with the questionnaires.

The specialist then drove the test course or the reverse depending upon the counterbalancing; in this way, the specialist either saw the road turns in the left view (in the regular LCD) or in the right view (in the DID). During the drive, the specialist reported all sightings of people and vehicles. In this process, the research coordinator recorded the test time as measured by stopwatch. Following this, the specialist then recalled the sightings and plotted the same on the town map and completed the workload and motion sickness ratings. The specialist then repeated the process by driving the road course in the reverse direction, again, reporting all people and vehicle sighted during the drive, and upon completion, plotting the sighting recalled upon a town map and completing the ratings.

Having completed the driving task, the specialist was next introduced to the map task including a sample training map with the target types (dismounted Soldier, vehicle, armored vehicle), threat ID (friend, unknown, hostile), and location as indicated by map icons. The specialist was introduced to the map grid system and practiced reporting target parameters and locations on both the DID and regular LCD. The specialist then operated the first map on either the DID or regular display per the counterbalancing scheme. In this process the specialist reported the type, threat ID, and location by grid square and square coordinates estimated to the nearest $10^{th}$. The grid square coordinates were in a Bold Arial font, size 10 alphanumerical system with letters along the top of the map and numbers along the left side. While reporting the specialist used the mouse to draw a circle around the target being reported with the cursor. The research coordinator recorded the reported parameters on a paper map and recorded the task timer by stopwatch. The specialist then completed the ratings. This process was then repeated for the next map on the other display.

At the end of the exercise, the specialist completed the exit questionnaire and discussed his or her evaluation with the research coordinator.

Experimental Design:

The experimental design was a 2×2 factorial within-subjects on display (dual versus regular), and task (driving or map planning), with the display counterbalanced. The dependent variables are the task time (driving: route time, map: target reporting), task inaccuracy (driving: target recall; map: target location), and task errors (driving: off-road, recalls missed; map: targets mislabeled, targets missed), and the ratings for the motion sickness (including the Oculomotor symptom) and workload questionnaires.

Data Collection and Reduction:

The task times were recorded by stopwatch. The driving task time is the time to drive the road segment or the reverse depending upon the counterbalancing. The map task time is the average time to report the parameters of a map target (type, threat ID, location) and was computed as the total time to report the targets divided by the number of targets reported.

The people and vehicles recalled for the driving scene as plotted on the town map were compared to the actual locations and the number missed was counted as errors; the plotted locations were compared to the actual locations and the sum of the differences as measured in number of town blocks was the inaccuracy measure.

The type, threat ID, and location reported for the map targets were compared to the actual values and any differences were counted as errors, along with any targets missed. The inaccuracies were the standard deviation (mean square) in locations of the reported targets measured in map square coordinates (0-10 per square side).

Data Analysis:

The performance measures and ratings from the questionnaires are analyzed in separate mixed linear affects models with the display and task as fixed effects for the treatments. The covariance structure is variance components. Contrasts are conducted as planned comparison among conditions to tests specific hypotheses of interest; all post-hoc pair-wise comparisons are multiple comparison Least Significant Differences tests.

Results:

Task Times:

The task time is significant by the sequence-by-task-by-display interaction (F=10.900, dfn=2, dfe=24, p=0.000). The interaction is significant because of the increased driving time on the regular display in the second sequence.

Task Inaccuracy:

The task inaccuracy is significant by the task (F=92.968, dfn=1, dfe=24, p=0.000).

Task Errors:

The task error is significant by the task (F=21.687, dfn=1, dfe=24, p=0.000) with more errors in the driving reports than the map task. The incidences of off-road driving were too few for analysis and only occurred for two specialists at a road intersection with a right angle turn. None recalled more people or vehicles than were in the driving scene; most recalled fewer than were there; of those vehicles recalled, all were identified correctly. Most reported all targets on the maps; two reported all but one target each. No errors were made in type or threat ID; a few made errors in map square designations, the most common being confusing "O" for "Q".

Perceived Workload:

The ratings are not significant by the treatment effects and their interactions.

Motion Sickness:

The Central symptom rating is significant by task (F=6.811, dfn=1, dfe=24, p=0.015), but none of the other effects or interactions. The symptom is rated greater for the driving task (14.306+/−0.715) than the map task (11.677+/−0.715). None of the other motion sickness symptom ratings or the Oculomotor symptom ratings are significant.

Comments:

The specialists preferred the regular-view displays since the image quality was less for the DID. Although they reported the DID suitable for the driving task some found the driving scene slightly fuzzy and that it took longer to identify a target from the screen. They found the text and numbers of the map display on the DID more difficult to read and not as bright and therefore preferred the regular-view display for that task. A few reported more eyestrain with the DID perhaps from having to focus more intensely with that screen. A few reported that this might have been caused by having to view the screen from the side rather than directly.

In summary, despite the preferences for the ViewSonic and DELL monitors over the DID, the simulator exercise showed no significant differences in task performance and subjective workload by display. The significance of the error by task is to be expected since the map task used foveal vision for the fine levels of details while the driving task required only peripheral vision and the lower display resolution did not matter. However, the specialists may have increased their driving time on the regular display in the second sequence because the increased resolution may have afforded more detailed search.

Crew Interactions on DID

Following the crew station exercises, the specialist operated the driving simulator while the research coordinator used the computer mouse to move displays between the screens of the robotic planning station and manually touched virtual touch panel buttons on the DID. Some specialists reported that they found the movements of the map displays in their peripheral vision to be distracting especially those maps with a white background, while others reported not being bothered. All but one reported that the hand movements and the manual touching of the DID screen did not bother them; this was because these movements were expected and they could see the initiation in their peripheral. The one specialist who was bothered misunderstood the purpose of the movements and thought that the researcher was pointing to objects in the driving scene for him to consider. In summary, hand movements by the other crew member caused no distraction during driving since it could be predicted; however, under stress the purpose of the movement may be misunderstood and distract the driver from his task.

Study Summary

The study show that the dual-image display monitor is reasonably suitable for use as a crew-shared display in crew operations. While the barrier design of the prototype DID monitor with its alternating dropped pixel columns reduces both the display luminance and the sharpness, there is little degradation of the other measures of image quality such as brightness contrast and color chromaticity. Since the barrier design is consistent across the display no image distortions occur. While the luminance for the left and right side views is symmetrical about the normal viewing direction, the color chromaticity and the readability of text, symbol recognizability, and line clarity do not vary with viewing angle. Because of the filtering action, the barrier reduces the resolution from a full screen 1280 by 1024 XVGA resolution (landscape orientation), to a 640 by 1024 resolution for the two views separately.

This may be the reason why the image quality measures of the regular view ViewSonic and DELL monitors were rated higher than those of the DID. Although the specialists preferred the single image LCDs to the DID for use in a crew configuration, most said that the prototype was acceptable for indirect vision driving but not for the robotic station because of the need for increased brightness and resolution of details, especially for reading text. This follows from the exercise in the fixed-base driving simulator configured for crew operations; the DID was a center display shared by the crew of the driving station and the robotic course planning station. However, despite the stated preferences, the simulator exercise showed no significant differences in task performance and subjective workload by display (i.e., single-image LCD or DID), The task time was significant by the task, sequence, sequence by display interaction, and the interaction of task by sequence by display, but this was because of an increased driving time on the regular display in the second sequence.

The view of the prototype DID from the side did not produce notable distortions in the driving scene at least according to the comments by the specialists. The optimal viewing angle (roughly 27°) appears acceptable for ground vehicle seating designs involving adjacent crew stations; the range in viewing angle range that is acceptable (17° to 39°) about this optimal allows sufficient head displacement (−10° to 12°) about the design eye location as determined by the seat harness for the Soldier. This follows from an analysis of a common crew station layout that was available to us.

When used in the crew station configuration with single-image LCD monitors, the incompatibilities between display characteristics of image quality, distortions, and processing delay were not enough to interfere with task performance and the slight motion sickness reported was not bothersome at least according to the specialists. While a significant Central symptom was reported for the driving task, this may have been caused by the discrepancy between the moving scene and the fixed base. Any delay in display signal processing by the DID processor was not noticeable. Finally, crew display operations on the shared display did not interfere with the scene visibility since a hand reach for the operation of the touch panel switches was readily tracked from the peripheral vision of the driver.

Comparison of Display Design Standards

A comparison of the results to the military display design standards shows that while the single-image LCD's satisfy the standards, the results with the prototype DID may be marginal especially for the display luminance and the legibility of the characters and symbols. However, this need not be the case for the visibility of external scene objects in driving and target detection.

Legibility:

For the regular view ViewSonic display, the font size of 10 or 9 was rated legible, a ⅛ inch symbol rated as being recognizable, and a line at an angle appeared only slightly jagged. These results are in agreement with the display standards that specify a minimal angular size for legibility of about 16-minutes of visual arc (DoD, 1999; Avery, Sanquist, O'Mara, Shepard, &Donohoo, 1999), and a minimum acceptable size for symbology as about 20-minutes (DoD, 1999; Avery, Sanquist, O'Mara, Shepard, &Donohoo, 1999). The font size of 10 and 9 are equivalent to character heights of 0.111 inches and 0.100 inches respectively, for a 1280 by 1024 raster display. At a viewing distance of 20-inches, these fonts subtend 19.0 and 17.2 minutes of arc which are near the minimum of 16 minutes for character legibility. In contrast, the font 8 has a character height of 0.089 inches and subtends 15.3-minutes somewhat below the standard. The ⅛-inch symbol subtends 21.5-minutes of arc which is near the minimum of 20-minutes for visibility and the ¹⁄₁₆-inch symbol subtends 11.2-minutes much below this limit. Consequently applying the standards to the regular-view LCD would produce the expected performance.

However, the results for the DID do not quite satisfy the display standards for legibility. This is because while the font size of 12 or 11 was rated as legible for the DID this is less true of fonts size 10 or smaller; a ¼inch symbol was rated as recognizable but this is less true of symbols ⅛ inch or smaller; a line at a 60° degree angle to the horizon appeared broken jagged because of aliasing while a vertical line appeared twice as thick. For a 1280×1024 raster display, the font size of 12 and 11 are equivalent to character heights of 0.134 inches and 0.122 inches respectively, and at the viewing distance of 20-inches, they subtend 23.0 and 21.0 minutes of arc, well above the minimum acceptable standard. The ¼-inch symbol subtends 43.0-minutes of arc well above the minimum acceptable. Consequently, the font and symbol have to be larger than the standard to produce satisfactory performance.

In addition, while the single-image LCD's would satisfy the requirement for character stroke width, this would only be true on the prototype DID for the font 12 and larger since the smaller fonts would appear deformed with a thicker stroke because of the dropped lines. The requirement for stroke width is that it not be less than ¹⁄₁₂ nor greater than ⅙ the number of pixels used for character height (DoD, 1999); it is recommended that stroke width be 1:6 to 1:8 black on white, or 1:8 to 1:10 white on black (Avery, Sanquist, O'Mara, Shepard, &Donohoo, 1999).

These results for the font and symbol size are for a viewing distance of 20-inches which is preferred for a video display screen with a keyboard (DoD, 1999); however, the typical eye-to-screen distances for military cockpits is from 24 to 36 inches with a mean of 30-inches, which is about the distance used in the crew station evaluation, and the font and symbol sizes have to be increased accordingly.

Display Luminance:

The brightness of the ViewSonic LCD with a normal display luminance of 67.9 FL is about equivalent to the recommended illumination levels of interior lighting for visual tasks of relatively high contrast and larger size (Sanders & McCormick, 1993). This is not true for the prototype DID with the display luminance of 27 FL at a viewing offset at 26.9°, a decrease caused by the barrier filter blocking a portion of the 87.6 FL luminance of the base monitor.

Multiple Display Configuration:

The brightness contrast across displays with the prototype DID in a multiple-display crew station is greater than that recommended in the standards. The preferred viewing angle brightness of 27 FL for the DID is about 60% of the normal luminance of the regular view ViewSonic. This is greater than the +/−20% limitation in luminance contrast across displays that is recommended for changing from one display to another, say from a map display to a video in a crew station (Avery, Sanquist, O'Mara, Shepard, &Donohoo, 1999).

External Scenes:

The acceptable rating of the prototype DID for driving may be because of the nature of visual discrimination of external scenes. It has been reported that complex shaped objects must subtend at least 20 minutes of visual angle and 10 resolution elements to be distinguishable (Grether & Baker, 1972). This is in agreement with Johnson's 1958 criteria for the resolution (in TV lines of bar pairs) of the minimum object dimension for visual discrimination; detection requires about two lines, recognition 8-lines, and identification about 12-lines (as reported in Rosell and Willson, 1973). The prototype DID provides a 640 by 1024 raster image of the driving scene and since most innate external objects are longer than they are tall, their minimum dimension is in the vertical direction, that is, the screen axis of greater resolution. Thus, external objects would tend to be visually discriminable at the same distances as with a 1280×1024 regular-view LCD.

Resolution:

The specification for the image resolution is a function of the task (i.e. indirect vision driving or target detection, map and text reading) and operating environment (i.e., lighting level, vehicle vibration levels). The image resolution should be specified at the level of the font and scene structure needed for the task. The image resolution is fixed by the barrier design and the LCD panel resolution would be twice that of the image in the horizontal direction for the DID. This is because the DID controller drops every other pixel from an image and maps the remaining data to alternate pixel locations in the panel. The two images are woven together and divide the effective display resolution in the horizontal direction, thereby reducing the image resolution from 1280 by 1024 pixels to 640 by 1024. Each image effectively consists of data at every other panel pixel location; the images are offset from each other by one pixel and together form the panel output. To an observer, the resolution difference is seemingly negligible since each image is stretched across the entire horizontal dimension of the display.

Further consideration must be given to the possible degrading of the image resolution by the barrier. For this reason, it is of interest to consider the visibility of the pixel elements themselves and of the barrier matrix. Magnified, each subpixel of the reference barrier would appear as a luminance bar of area $d*p_o$ centered in a dark bar of area $2p*p_o$, where $p_o$ is the total pixel height, $p_o=3*p$, for a square pixel. In turn, the pixel element would appear as three such luminance bars of different colors centered in a dark bar of area $6p*p_o$, and spaced a distance ω apart. It is understandable that the subpixels cannot be discerned as separate elements at natural vision from a normal viewing distance of say 20-inches since the angular separation is on the order of ½ minute of visual arc and this is well within the threshold of visual acuity for separating light sources. However, another issue is the vertical line structures formed by the barrier matrix; these lines are of width ω running the entire image vertically and spaced a distance d apart. Using natural vision from a normal viewing distance of say 20-inches, the barrier lines subtend about 46 seconds and the separation 35 seconds of visual arc, well above the visual acuity threshold limit of ½ second visual arc for detecting line structure. That this could be a problem is supported by some of the comments made by specialists following the display evaluation phase.

Considering text defined by say, an 8-pixel by 8-pixel bitmapped font array where each character is comprised of eight horizontal lines, containing eight pixels each, the resolution of the image may be degraded by the barrier filtering process. This would be because the dropping of alternate pixels in the horizontal font line could change the shape of the text character, the barrier matrix may appears as lines running through the character, and embedding the pixel in a dark matrix could modify the font type although analysis suggests that the latter is not a problem. As is suggested from the results of the technical evaluation, this problem is not noticeable at the larger fonts because of the larger character array sizes. Similar comments apply to figures and other line structures that are defined by a linear sequence of pixels and the dropping of alternate pixels may result in increased aliasing of edges and tilted lines. This effect is more noticeable with the smaller figures. For this reason, the font size of 11 or greater and a symbol size of 3/16 inch or greater are preferred for the DID.

Study Summary

In summary, the results show that while there is a definite viewing range for the DID prototype that is preferred by the users, both the rating results and the comments show that the DID would be acceptable for indirect vision driving and for use as a map display with larger symbols and text fonts. The study shows that the DID monitor is reasonably suitable for use as a crew-shared display in crew operations. While the barrier design of the DID monitor with its alternating dropped pixel columns reduces both the display luminance and the sharpness, there is little degradation of the other measures of image quality such as brightness contrast and color chromaticity. The DID was acceptable for indirect vision driving; the simulator exercise showed no significant differences in task performance and subjective workload by display. The view of the prototype DID from the side did not produce notable distortions in the driving scene. When used in the crew station configuration with single-image LCD monitors, the incompatibilities between display characteristics of image quality, distortions, and processing delay were not enough to interfere with task performance. Any delay in display signal processing by the DID processor was not noticeable. Finally, crew display operations on the shared display did not interfere with the scene visibility since a hand reach for the operation of the touch panel switches was readily tracked from the peripheral vision of the driver.

Dual Displays According to Embodiments of the Present Invention

Having presented the results of these studies for an exemplary prototype display monitor, various dual displays are now presented according to embodiments of the invention. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a display system and method for use in multiple crew means of transportation, such as a manned armored vehicle, which is capable of being used by multiple vehicle crewmembers simultaneously without limiting each crewmember's vision, range of motion, and ability to properly conduct their respective tasks. The embodiments herein achieve this by providing a shared video display system that provides separate virtual displays to multiple users from a common display monitor, and a means for independently interacting with the displays. Referring now to the drawings, and more particularly to FIGS. 16 through 22, where similar reference characters denote corresponding features consistently throughout the figures, there are shown preferred embodiments.

Figure 2:
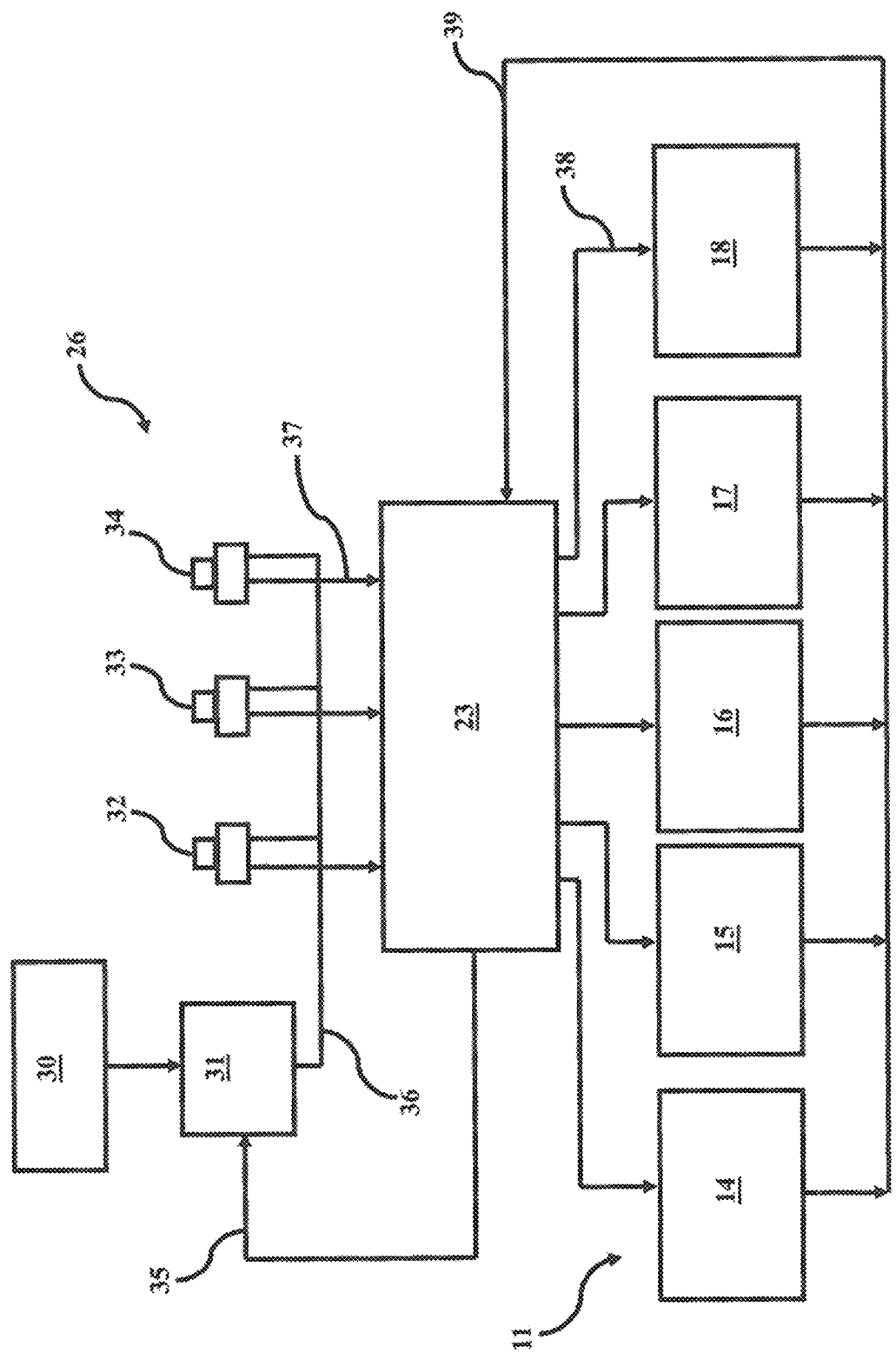
FIG. 2 is a schematic diagram of the video processing for the displays and the processing of the display controls according to the conventional approach.
Figure 16:
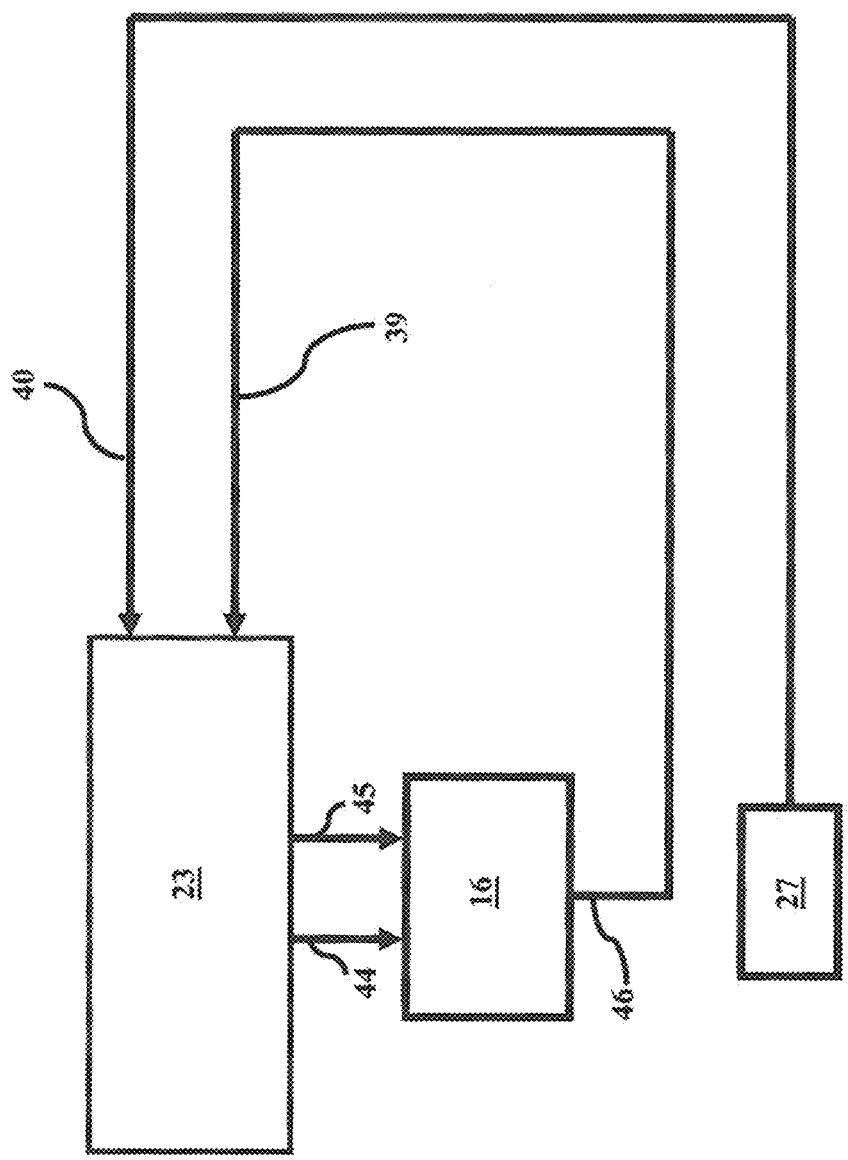
FIG. 16 is a schematic diagram of the video processing for a crew-shared display and the processing of the display controls according to an embodiment herein.
Figure 16:

FIG. 16 shows the middle display 16 (of FIG. 1) configured as a two-way controlled-view display component of a crew shared display system 49 with a double video feed 44, 45 from computer 23, and a hand-locating interrogator 27 with data line 40 to computer 23. As with FIG. 2, the system 49 illustrated in FIG. 16 shows an output 46 from the touch screen (and contact button/switch) processor (not shown) of middle display monitor 16 to the data line 39 of the computer 23.

A preferred embodiment of the middle display monitor 16 comprises a controlled-view LCD display panel 50, shown in FIG. 17(A), and a means for two crewmembers to both interact with display 50 using touch screen buttons. Generally, display panel 50 is used as a replacement for the middle display monitor 16 of the crew-shared display system 49 (of FIG. 16). FIG. 17(A) illustrates the controlled-view LCD monitor 50 for crew sharing with touch screen buttons 51, 52 arranged in this embodiment along the left and right sides, respectively. The display monitor 50 is shared by the two crewmembers and they each see different display images and different touch screen button legends depending upon their respective viewpoint. In the depicted embodiment, the user on the left sees the virtual display image 53 and the touch screen button legends 54 on the left side, while the user on the right sees the virtual display image 55 and the touch screen button legends 56 on the right. Since the embodiments herein are used as the central display monitor 50, the two users could both activate the same display screen buttons because of their proximity to the display monitor 50 as they perform their different tasks. However, for the intended application the central display monitor 50 is preferably positioned normal to the forward direction since it is to one side or the other of each crewmember and cannot be tilted in for easy reach. During vehicle travel, the reach of the crewmembers is limited by their seat safety harnesses and they should be able to reach only the closest side and center of the display monitor 50. While the use of the touch panel by a hand reach of one user may physically obscure that part of the display monitor 50 from the view of the other user, the judicial assignment of touch screen buttons 51, 52 to the side nearest the user minimizes this problem. There are times, however, when a display element may have to be selected from the central portion of the display monitor 50 for example during course planning from the tactical map and the display action can only be determined from the identity of the crewmember.

The controlled view display may include any commercially available display technology including an extension to multiple viewing directions of the autostereoscopic display technologies. Some of these display systems use a lenticular screen while others use a parallax barrier, placing a screen of vertical stripes behind or in front of the display panel. In these designs, the displayed image is created in vertical strips of right and left pairs giving a different viewpoint for each eye. A vertical lenticular screen may be included in front of an LCD panel, whereby the display software divides the image created by a graphics program into sets of left-to-right image strips that are displayed on the LCD panel. Alternatively, the stereoscopic display may use a parallax barrier system superimposed on an ordinary thin-film transistor (TFT) LCD panel; the TFT LCD panel displays vertical strip pairs of image slices, but does not require a lens in front of the screen. A second LCD panel between the backlight and image sources provides the parallax barrier. Still alternatively, a parallax barrier LCD panel may be used. Additionally, a controlled view LCD panel may be configured by modifying these technologies to separate the light from the backlight into right and left directions. The use of these controlled view LCD panels enables the simultaneous display of different information and visual content depending on the viewing direction. In this way, two crewmembers can both use the same display panel to display information needed for their different tasks. The viewing directions of the display can be optimized for the designed seating positions of the intended application to accommodate limited freedom of body movements due to seat safety harnesses.

This optimization is possible since the viewing directions of the different images are determined by the display design. For example, consider a section side-view of an autostereoscopic display 160 shown in FIG. 17(B) with a parallax barrier 170 mounted over a color LCD panel 180 where the pixels 181 of one image are alternated with pixels 182 of the other by the display controller (not shown) receiving the video data input 44, 45 from the computer 23 best shown in FIG. 16. Each pixel 181, 182 in the color LCD panel 180 comprises three color rectangular sub-pixels defined by red, blue, and green filters aligned in columns. The two images from the separate video drivers (not shown) are woven together by a display controller (not shown) at the sub-pixel level. As can be seen in FIG. 17(B), the parallax barrier 170 routes the light from the sub-pixels 182 to the respective images; for example, the image seen from the viewing angle 185 results from the light emitted at that angle from the gaps between adjacent barrier elements. In this way, the image distribution is determined by the width of the sub-pixels 182, the width and thickness of the barrier elements 171, the separation distance 172 between elements 171, and the spacing 173 between the display panel 180 and the barrier 170. As shown in the associated luminance plot 190 of FIG. 17(C), the image luminance 191 varies with the viewing angle 192 for both the right side viewing image 193 and the left side image 194. The luminance for a viewing side is at a maximum at the central direction 195, which is the maximum luminance viewing angle, from which most of the display area is seen and falls off to either side as more of the display area is obscured. The image viewing zone is matched to the geometry of the crew station layout design by proper specification of the parameters of the parallax barrier 170 (of FIG. 17(B)). With such a design, central direction 195 would be that seen from the nominal design eye position (not shown) relative to the central display monitor 50 (of FIG. 17(A)) as specified by the crew station layout. The acceptable angular viewing range 196 is that which is needed to accommodate the display size from the nominal eye position; however, consideration must be given to the range of eye positions that occur about the nominal position with movements in head position as allowed by the seat restraint system (not shown).

The touch screen technology may include any commercially available touch technology and a screen controller for sensing the touch and the location and outputting the touch coordinates as a peripheral device. The technology may be capacitive, resistive, infrared, surface acoustic wave, or grounded acoustic wave, and near-field imaging among others. The capacitive touch screen is based on a capacitive coating added to a clear glass sensor; touching the screen disturbs the otherwise uniform electric field that results from the application of a voltage to the screen corners and the screen controller outputs the coordinates of the touch point. Similarly, the resistive touch screen is based on a hard-coated, conductive polyester top sheet separated by microscopic spacers from an underlying conductive clear glass sensor; touching the screen compresses the polyester sheet into contact with the glass sensor. When contact is made, the end voltages are in proportion to the distance of the touch point from the edges. As in capacitive technology, the screen controller outputs the touch position. With infrared technology, a touch breaks the beams from infrared light emitting diodes embedded in a mounting bezel placed about the screen edges with diametrically opposing phototransistor detectors; and these coordinates are outputted by the screen controller. With acoustic wave technology, a touch absorbs part of the ultrasonic waves that are mechanically propagated in the surface of a glass overlay between transmitting and receiving piezoelectric transducers that are placed about the screen edges with reflective arrays, and these coordinates are outputted by the controller. The near-field imaging technology includes two laminated glass sheets with a patterned coating of transparent metal oxide in between; a mechanical touch disturbs the electrostatic field created on the surface of the screen by an alternating voltage applied to the patterned conductive coating. Gloves are a hindrance for operating the capacitive touch screens for which a grounded stylus can be used.

Dual Display Control for the Dual Display Embodiments

Figure 18A:
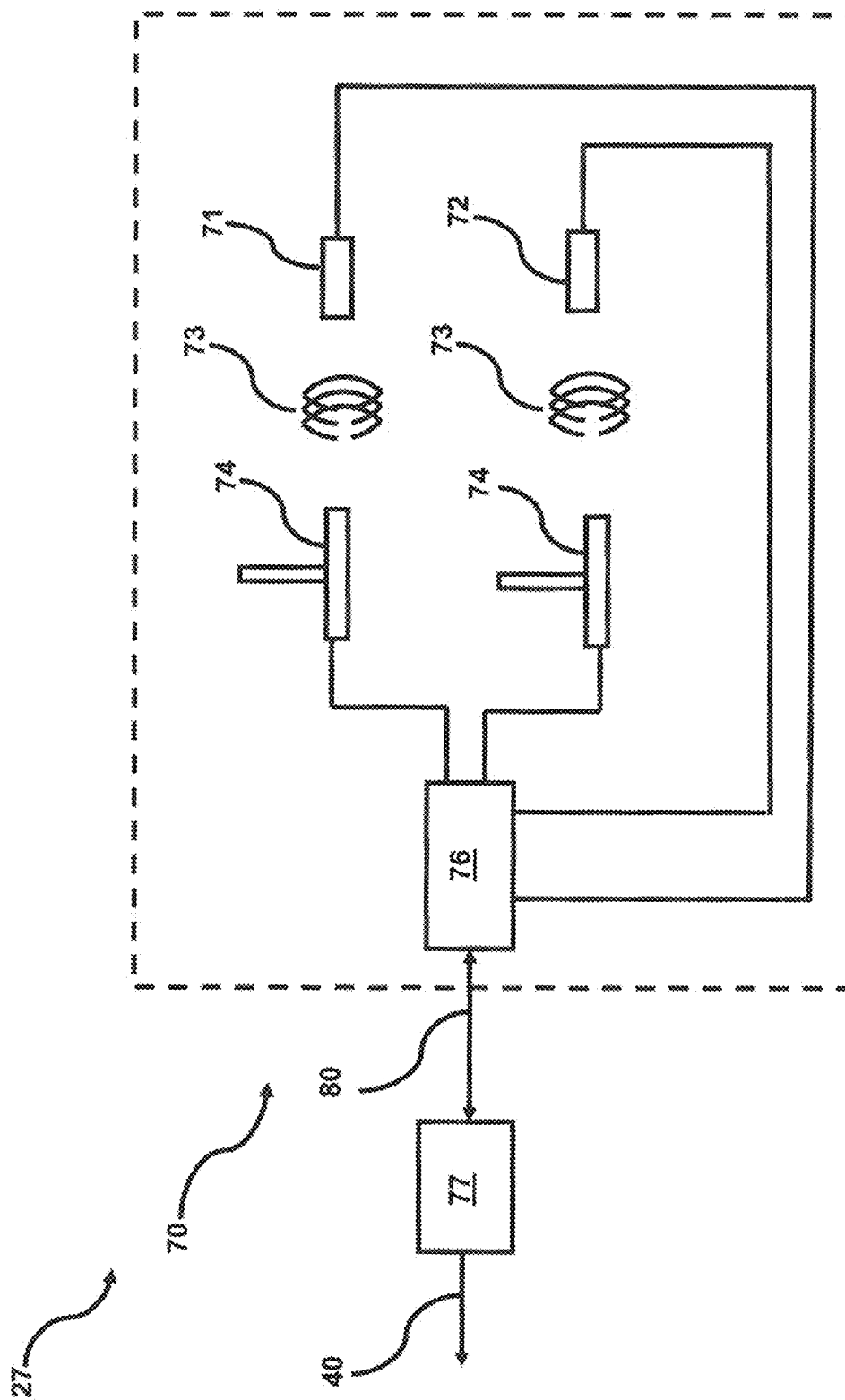
FIG. 18(A) is a schematic diagram of a touch screen interrogator using hand-locators for dual-use activation according to an embodiment herein.
Figure 18B:
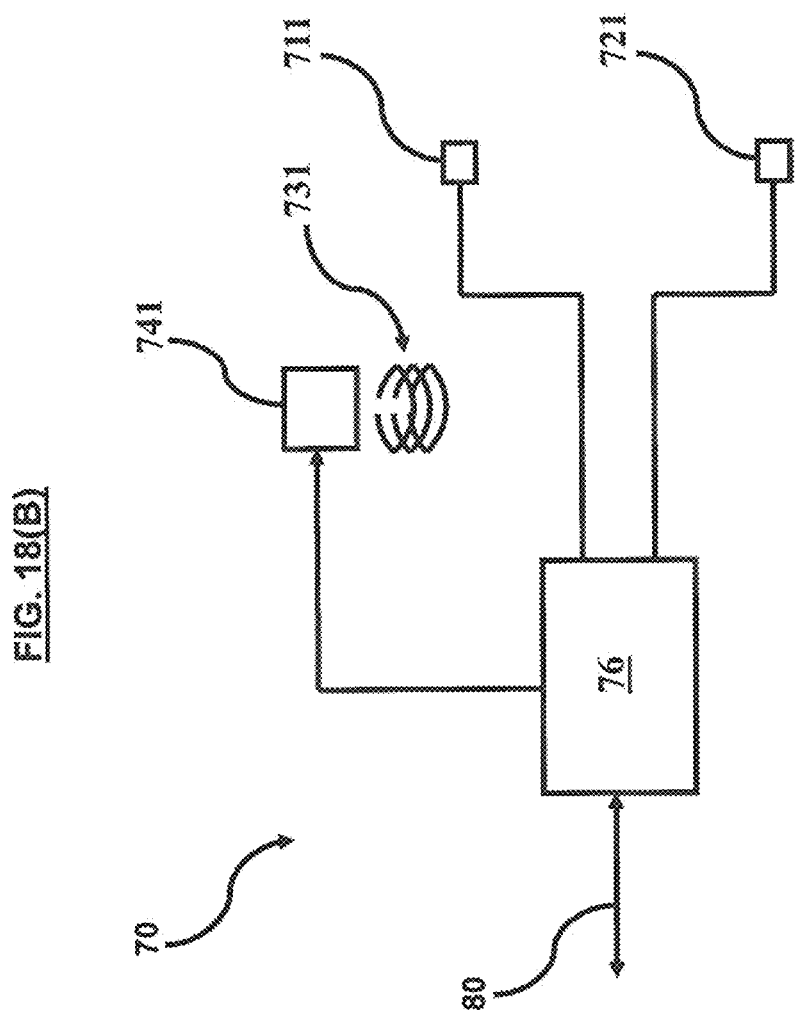
FIG. 18(B) is a schematic diagram of a hand-locator using a magnetic system according to an embodiment herein.

The embodiments herein further incorporate the hand-locating interrogator 27 (of FIG. 16) as one novel manner of differentiating between the users of the central display monitor 50 (of FIG. 17(A)) based on the measurements of the locations of their hands in the display workspace. This is performed to preclude machine confusion over the assignment of the activation of a touch screen button 51, 52 to a particular task. FIG. 18(A) is a schematic of such a hand-locating interrogator 27 comprising of a controller 77 and a hand-locator 70. The controller 77 calls for the hand-locating via data line 80 and with embedded knowledge of the display workstation geometry, computes the locations relative to the display monitor 50 (of FIG. 17(A)), and upon changes sends the hand locations with user identifiers to computer 23 via data line 40 (of FIG. 16). The hand-locator 70 comprises of emitters (sensors) 74 mounted about the display monitor 50 (of FIG. 17(A)), with energy fields 73, and sensors (emitters) 71, 72 that are controlled by a processor 76 connected to the controller 77 by the data line 80. The users each wear the corresponding sensor (emitter) 71, 72 on the hand closest to the shared display monitor 50 (of FIG. 17(A)) since this is the hand used to operate the touch screen panel. During operations, the users are restricted in full body movement by the seat safety restraint harnesses (not shown). For example, sensor 71 may be placed on the right hand of the user in the left hand seat and sensor 72 on the left hand of the other user. The sensors 71, 72 continually locate the hand when in the vicinity of the display monitor 50 (of FIG. 17(A)). The use of multiple emitters (sensors) 71, 72 allow the location of the hand to be determined in the user's workspace by triangulation of the signals. Upon receiving a locating command from the controller 77 via the data line 80, the processor 76 cycles through the sensors 71, 72 in the order in which they are assigned to the crewmembers and then returns their locations. The hand-locator 70 may include any conventional locating technology and a controller for interrogating the location and orientation of the sensor 71, 72 and outputting the coordinates as a peripheral device.

For this reason, the hand-locator 70 may be of many different types depending upon the embodiments, such as magnetic, optical, acoustic, or radio-frequency among others. For example, in one embodiment shown in FIG. 18(B), the hand-locator 70 comprises a magnetic system comprising of a processor 76 with a magnetic field source 741 of an alternating current or pulsed field 731 fixed to the vehicle frame (not shown) in the vicinity of the display monitor 50 (of FIG. 17(A)) and with field sensors 711, 721 attached to the hands. Each sensor 711, 721 is attached to a user's hand on the side closest to the shared display monitor 50 (of FIG. 17(A)) since this is the hand used to operate the touch screen because of the seat safety restraint. For example, sensor 711 may be placed on the right hand of the user in the left hand seat 12 (of FIG. 1) and sensor 721 on the left hand of the other user in the right hand seat 13 (of FIG. 1). The magnetic field source 741 and sensors 711, 721 each comprise three orthogonal coils. The sensors 711, 721 record the strength of the magnetic field 731 components generated by the source 741 and these recordings in turn are converted to the position and orientation of the hands in the coordinate system of the magnetic field source 741 by the processor 76. Upon receiving a locating command from the controller 77 (of FIG. 18(A)) via the data line 80, the processor 76 cycles through the sensors 711, 721 in the order in which they are assigned to the crewmembers and then returns their locations. In order to overcome the problem of having the magnetic field of the source 741 being distorted in a metal armored crew station by the display fields and the currents induced in the surrounding metal panels, the embodiments herein adjust the sensor readings for the distortions using survey corrections for the crew station configuration.

In another embodiment shown in FIG. 18(C), the hand-locator 70 comprises an optical system where infrared Light Emitting Diode (IR-LED) source emitters 712, 722 emitting an energy field 732 such as infrared light, are attached to the hands and multiple sensors 742 are mounted about the display monitor 50 (of FIG. 17(A)). The LED sources may be pulsed by adaptive synchronization to allow the source emitters 712, 722 to be distinguished from each other and the locations determined by triangulation by a processor 76; the identity of the crewmember is determined from the pulsing order. Each source emitter 712, 722 is attached to a user's hand on the side closest to the shared display monitor 50 (of FIG. 17(A)) since this is the hand used to operate the touch screen because of the seat safety restraint. For example, source emitter 712 may be placed on the right hand of the user in the left hand seat 12 (of FIG. 1) and source emitter 722 on the left hand of the other user in the right hand seat 13 (of FIG. 1). Upon receiving a locating command from the controller 77 via the data line 80, the processor 76 cycles through the source emitters 712, 722 in the order in which they are assigned to the crewmembers and then returns the locations of the source emitters 712, 722.

In a further embodiment, the optical system uses a charge-coupled device (CCD) based digital camera (or Complementary Metal Oxide Semiconductor (CMOS) based camera) (not shown) in place of the sensors 742 (of FIG. 18(C)) and wide viewing-angle IR LED's are placed on the hands as source emitters 712, 722; a pattern of three LED's on a hand allows the determination of a full six degrees-of freedom of movement. In another variation, reflectors (not shown) illuminated by a separate IR source emitter are placed on the hands in place of the source emitters 712, 722; in this case, the hands are continuously tracked by the camera to determine the crewmember's identity from the movement history. The sensor input is threshold-limited to preclude any signal noise that is generated by other light sources and reflections between the user and the display monitor 50 (of FIG. 17(A)).

Figure 18D:
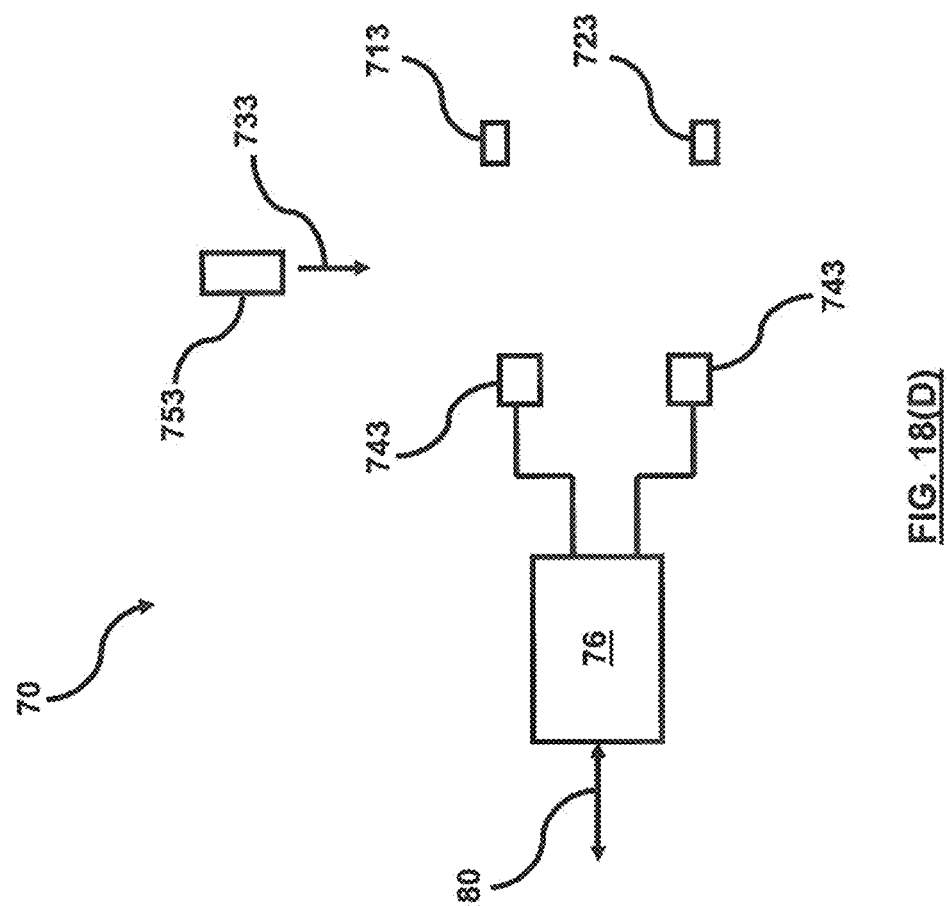
FIG. 18(D) is a schematic diagram of a hand-locator using an optical camera system according to an embodiment herein.

In a more advanced approach shown in FIG. 18(D), the sensors 742 (of FIG. 18(C)) comprise an array of opposite cameras 743 and the source location is determined by stereo reconstruction from the corresponding images following the application of intensity thresholds to the image scenes. In one version, the optical hand tracker comprises two cameras 743 capturing the stereo video images of the hands. The cameras 743 may be fitted with infrared pass-through filters (not shown) to ensure consistent lighting with an energy source 753 such as infrared lights used to illuminate the scene with infrared light 733. An illuminating array of infrared LED's (not shown) may be placed in a circular pattern around the camera lens for this purpose. Wide view lens (not shown) may be used to cover the display front from the camera position. Gloves may be used with patterns of reflective sensors 713, 723 to serve as tracking targets. An image processor 76 with frame-grabbers may be used to capture the camera image and the resulting digitalized image is processed using computer vision techniques to segment the hands from the background scene. The hands are continuously tracked to determine the crewmember's identity from the movement history. Upon receiving a locating command from the controller 77 (of FIG. 18(A)) via the data line 80, the processor 76 returns the locations of the tracked sources.

Figure 18E:
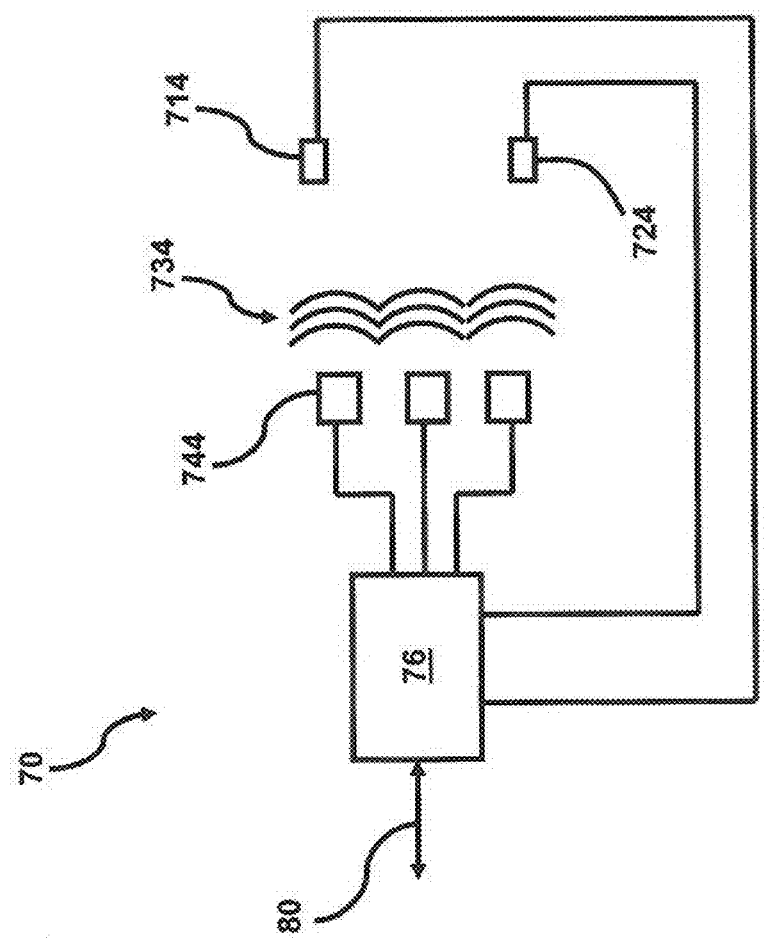
FIG. 18(E) is a schematic diagram of a hand-locator using an ultrasonic sound system according to an embodiment herein.

In another embodiment shown in FIG. 18(E), multiple ultrasonic transmitting sources 744 emitting an energy source 734, such as ultrasonic energy, are mounted about the display monitor 50 (of FIG. 17(A)) and sensors 714, 724 are attached to the hands. In one variation, the sources 744 are three ultrasonic emitting transducer speakers mounted in a triangular pattern at the corners of the display monitor 50 (of FIG. 17(A)), and the sensors 714, 724 are miniature ultrasonic sensitive microphone receivers embedded on a glove worn on the hand. A processor 76 synchronizes the transmitting sources 744 and the hand position is calculated by triangulation based on the relative times to receive the three ultrasonic signals; multiple receivers (not shown) in a triangular pattern on a hand enable the computation of hand orientation. Upon receiving a locating command from the controller 77 (of FIG. 18(A)) via the data line 80, the processor 76 cycles through the sensors 714, 724 in the order in which they are assigned to the crewmembers and then returns their locations. The process works best when the transmitters and receivers are along a line-of sight facing each other. The sensor input is threshold-limited to preclude any signal noise that is generated by reflections from the user and the display. Noise may reduced by filtering and noise absorbing foam (not shown).

Figure 18F:
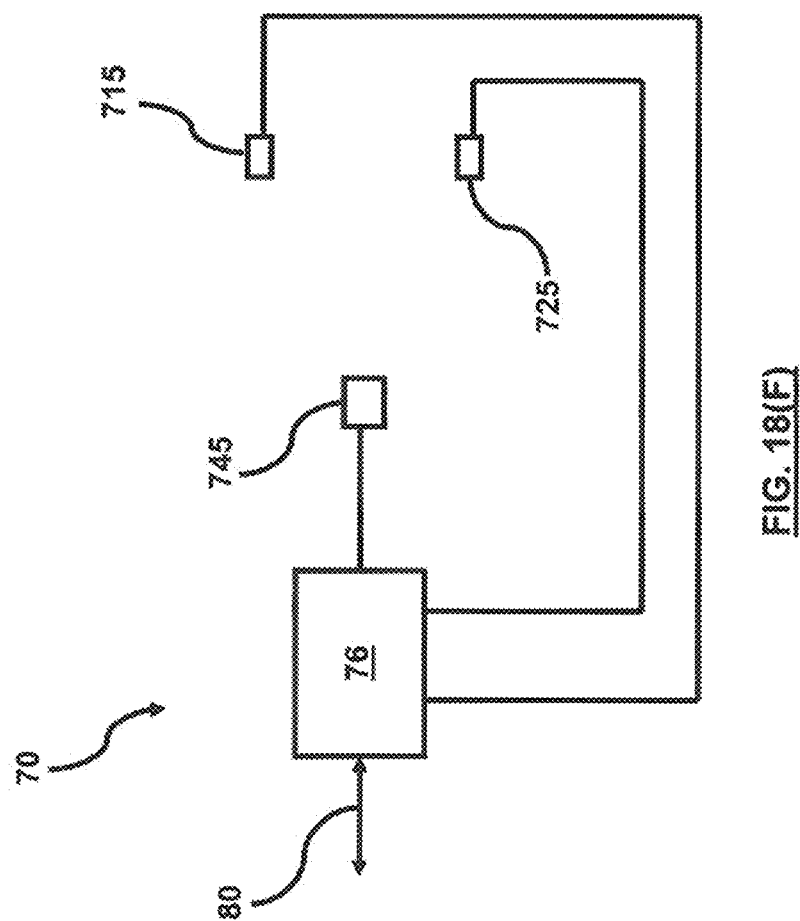
FIG. 18(F) is a schematic diagram of a hand-locator using inertial measurements with a microelectromechanical system according to an embodiment herein.

Similarly, as shown in FIG. 18(F), the hand-locator 70 may comprise microelectromechanical systems (MEMS) inertial measurement sensors 715, 725 that are attached to the hands, and the signals compared to similar MEMS sensors 745 placed on the display monitor 50 (of FIG. 17(A)). In this embodiment, the recordings for the movements of the hands are adjusted for that of the display monitor 50 (of FIG. 17(A)) by a processor 76 to determine the movements relative to the display front. Containing micro accelerometers (not shown) and gyroscopes (not shown), the sensors 715, 725 perform integrated measurements of movement and attitude relative to an inertial coordinate system from the linear accelerations and the angular rate of pitch, yaw and roll. In principle, the accelerometer (not shown) comprises a cantilever beam with one end fixed and the other on a proof mass; the movement of the proof end is proportional to acceleration. In micro-machined accelerometers the measurement of the beam movement may be based on a piezoresistive resistance in the cantilevered beam, capacitance with the proof mass between opposite electrode plates, as well as resonant, thermal optical, electromagnetic, or tunneling current techniques. Micro-machined gyroscopes use vibrating structures such as a quartz and silicon vibrating beam or shells, or tuning forks activated by electrostatic, electromagnetic, and piezoelectric devices. The action of the vibrating gyroscope is based on the Coriolis Effect with a rotation about one axis generating a force in an orthogonal direction while the centre masses vibrate in the third direction. The processor 76 synchronizes the measurements of the inertia data and computes the relative positions from the tracking data. Upon receiving a locating command from the controller 77 (of FIG. 18(A)) via the data line 80, the processor 76 returns the locations of the MEMS sensors 715, 725 on the hands relative to that of display monitor 50 (of FIG. 17(A)). The sensors 715, 725 returns may be by wire or wireless such as infrared or radio-frequency. In a further embodiment (not shown), the inertia sensor data are combined with ranging measurements to correct for the drift in the inertia units which can occur over time. These hybrid trackers may employ ultrasonic, optical, magnetic, or radio-frequency ranging methods to determine orientation and absolute position for integration and sensor fusion with the inertia sensor data.

Figure 18G:
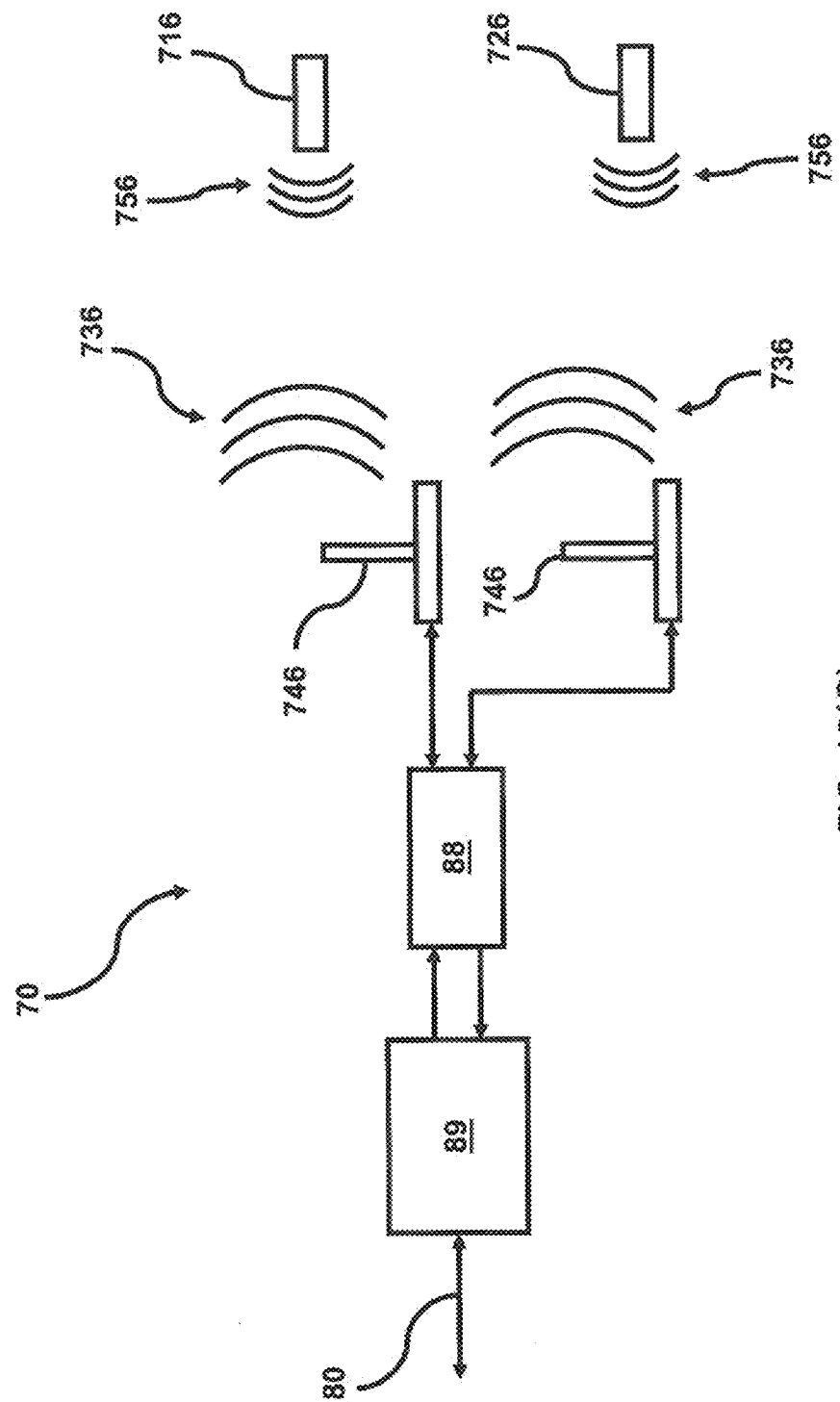
FIG. 18(G) is a schematic diagram of a hand-locator using a radio frequency identifier system according to an embodiment herein.

In still another embodiment, short-range radio frequency identification tags (RFID) are used to locate the users. FIG. 18(G) is a schematic of the embodiment showing a RFID reader or interrogator as a hand-locator 70 comprising of a decoder 89 and a transceiver 88 that sends and receives radio signals 736 via an array of antennas 746 with a set of ID tag sensors 716, 726. The ID tags 716, 726 are both sensors and transmitters, receiving radio energy 736 from the transceiver 88 and broadcasting back energy 756 to the transceiver 88. The decoder serves as the middleware between the controller 77 (of FIG. 18(A)) via the data line 80, activating the transceiver upon command and returning the locations of the tags 716, 726. Each tag 716, 726 is attached to a user's hand on the side closest to the shared display monitor 50 (of FIG. 17(A)) since this is the hand used to operate the touch screen because of the seat safety restraint. For example, tag 716 may be placed on the right hand of the user in the left hand seat 12 (of FIG. 1) and tag 726 on the left hand of the other user in the right hand seat 13 (of FIG. 1).

The tag 716, 726 may have an adhesive backing for attachment. In another variation, the tag 716, 726 may be attached or woven into a glove worn by the user. The tag 716, 726 may be of a size on the order of several millimeters, and may contain a passive transponder (not shown) that broadcasts an identifier when interrogated by the radio signal from the transceiver 88. The transponder contains three components (not shown): an integrated circuit with a computer microchip holding the ID, a tiny radio antenna made of a coil of copper wire wound around a ferrite (iron) core, and a capacitor for tuning the antenna. The minute electrical current induced in the antenna by the incoming radio frequency signal 736 provides sufficient power for the tag 716, 726 to transmit back another radio signal 756 with the identification number to the transceiver 88.

The radio signal sent by the transceiver 88 is typically on the order of one milliwatt at a relatively low 125 kHz frequency to reduce interference, but it can be at a higher ultra-wide band frequency in excess of 1 GHz. The transceiver 88 selects the tag 716, 726 to transmit by a process known as singulation based upon the identification number, and synchronizes multiple transceiver antennas 746 to prevent interference. Since there are only two tags 716, 726 present, the identification numbers need only be a single bit: "zero" or "one", and singulation is performed in a single pass without extensive "tree-walking" among the tag sensors 716, 726.

Transceiver antennas 87 may be mounted about the perimeter of the display monitor 50 or on the crew-station ceiling (not shown). Gate antennas are commonly 20 centimeters square and create a large read zone while the ferrite stick antennas are smaller (approximately a 140 mm long, 22 mm diameter cylinder) with a more focused read zone. The use of multiple transceiver antennas 756 allows the tag location to be determined in the user's workspace by triangulation of the signal response times. The system can localize to within an inch. Distance estimates made from the time of arrival of the received signals are more accurate with the higher frequencies.

One advantage of the RFID is that the user is readily distinguished by the broadcasted identifier. There is no need for a direct line-of-sight between the reader and the tag 716, 726 since the radio signal can be read through and around the human body, clothing, and other non-metallic materials. Read distances can extend to six meters, which is more than sufficient for a crew station. The transceiver 88 incorporates noise suppression techniques to reduce interference from reflections and other sources. Absorption coatings can be used on the crew station surfaces to reduce reflections.

In the above embodiments, the crew shared display is located to the side front of each crewmember and within the reaching distance needed to manually touch display buttons from the seated position. In still other crewstation designs, the displays may be disposed about the crewmembers within view but located beyond arm reach; this configuration affords more room for control access and flexibility in design. In one such example, the displays may surround the front view covering the upper, front, lower, and both side viewing directions; here, all displays may be dual image displays thereby affording a different image to each crew member on the same viewing surface. In this case, the displays may be operated virtually by finger pointing and with hand movements with any of the above hand tracking systems where both the hand and finger positions are tracked.

Of particular interest is the operation of the displays via virtual touchpanels in which the display buttons are in fixed locations. In this design, the operator need only move his hand toward the display button of interest from a memory of the display and peripheral vision leaving the foveal attention free for a concurrent task, then with a brief interruption, shift his foveal vision to guide a fixation cue into the display button before activating selection. This natural process allows the performance of concurrent tasks with minimal interference with foveal vision, an important advantage for driving and target location from video screens while activating discrete functions related to the task.

Figure 18H:
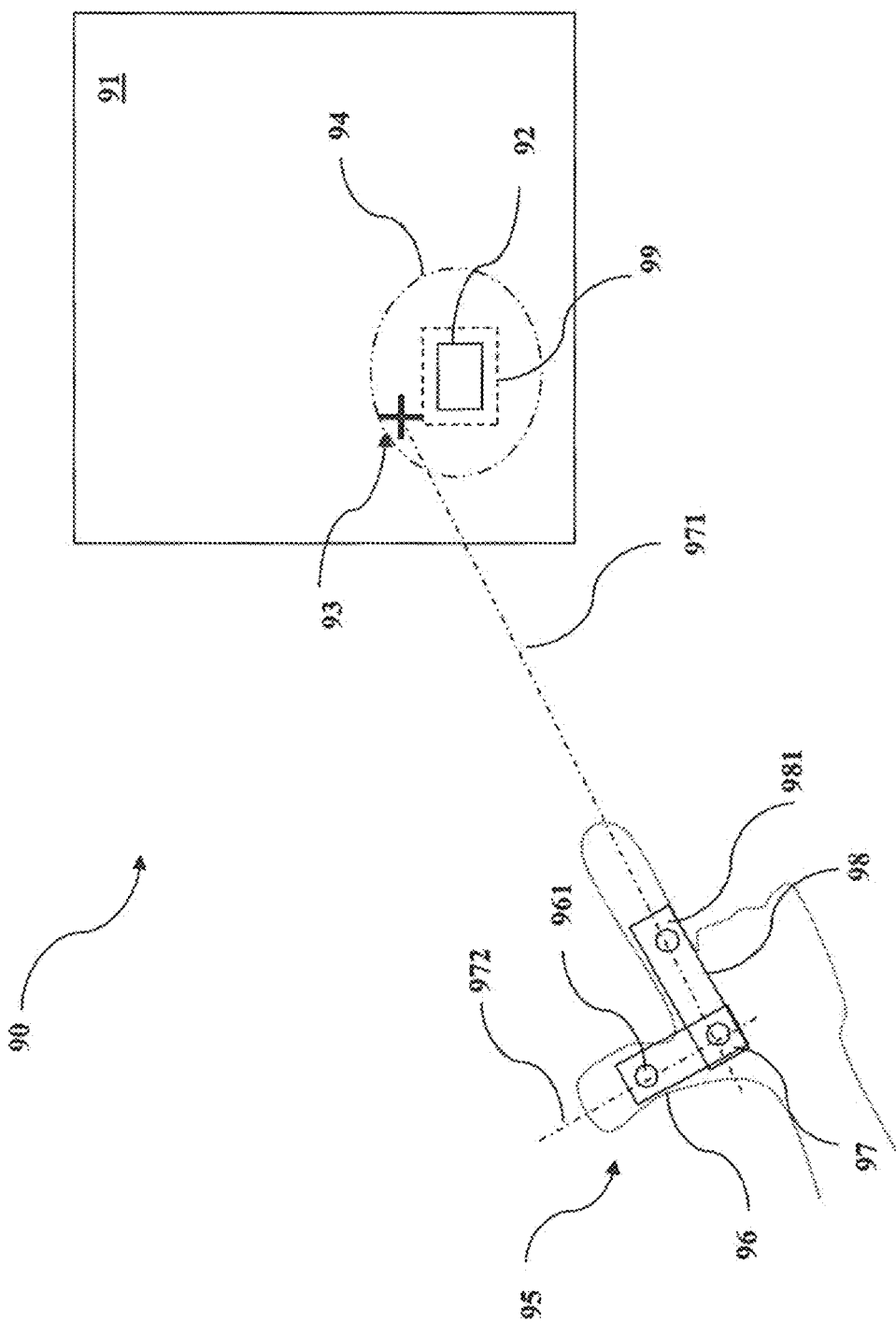
FIG. 18(H) is a schematic diagram of a hand-locator using a radio frequency identification system in which the user points to the display element for activation by virtual touch panel without manual touching according to the embodiment herein.

An embodiment of this design using the radio frequency identification system (RFID) is shown in FIG. 18(H) as an exemplary application 90 for display operations by hand and finger tracking. Here, the operator is selecting the virtual touchpanel display button 92 on the dual image display panel 91 with his gloved hand, 95. The glove has an array of three RFID sensors/emitters, affixed at the thumb 96, knuckle 97, and the index finger 98. In this embodiment, the pointing direction 971 to the display is determined by the knuckle element 97 and that 981 at the first joint of the index finger; while the selection is determined by the direction formed by the knuckle element 97 and that at the first joint of the thumb 961; the user is naturally most cognitive of these attachment points. In the figure, the operator has used his knowledge of the display to point his hand toward the virtual touch cueing zone 94 of the display button 92 and a virtual touch point cue is displayed as a crosshairs 93. Looking directly at the button, the operator briefly uses his foveal vision to move the crosshairs within capture zone 99 of the button 92 and then closes his thumb to his finger to designate selection.

While this method of operating remote displays using virtual touch panels has been embodied for the RFID technology, it is apparent that the method can be implemented with any of the other tracking techniques described above using multiple sensor (emitter) arrays. For example, multiple arrays of magnetic field sensors, infrared or ultrasonic sensors or emitters, or inertial tracking sensors may be substituted for the RFID elements; the video tracking is readily expended to track finger positions as well that of the hand.

Dual Use Encoding

In order to achieve a dual-use touch screen encoding process that determines the virtual touch screen activation based on the identity of the user as determined from the hand locations, the embodiments herein utilize a computer based control of the activation of the screen buttons 51, 52 (of FIG. 17(A)) where the switching action executed depends upon the button access area and the task as determined by the identity of the crewmember pushing the button 51, 52. When both users try to activate the same button area, the display monitor 50 uses a computer having at least one processor being configured to control a priority scheme to control access to the screen buttons 51, 52. The priority scheme locks out access to the area by the crewmember performing the lower priority task and activates an in-use warning to that user as feedback. Access reach conflict occurs when both hands are sufficiently close to physically touch since this can cause an erroneous button push. The button access area is selected large enough to preclude this possibility as determined by the locating sensor tolerance. However, access permission may apply to the display area closest to the user or the entire screen, as well as the button access area depending upon the task priorities. The warning may be a visual warning legend (ex., "Panel In Use") flashed at a designated display location as seen by the lower priority user, or auditory such as a tone or verbal, or a combination of both. The priority depends upon the ranks of the crewmembers, the importance of their tasks, and the corresponding task script.

Figure 19:
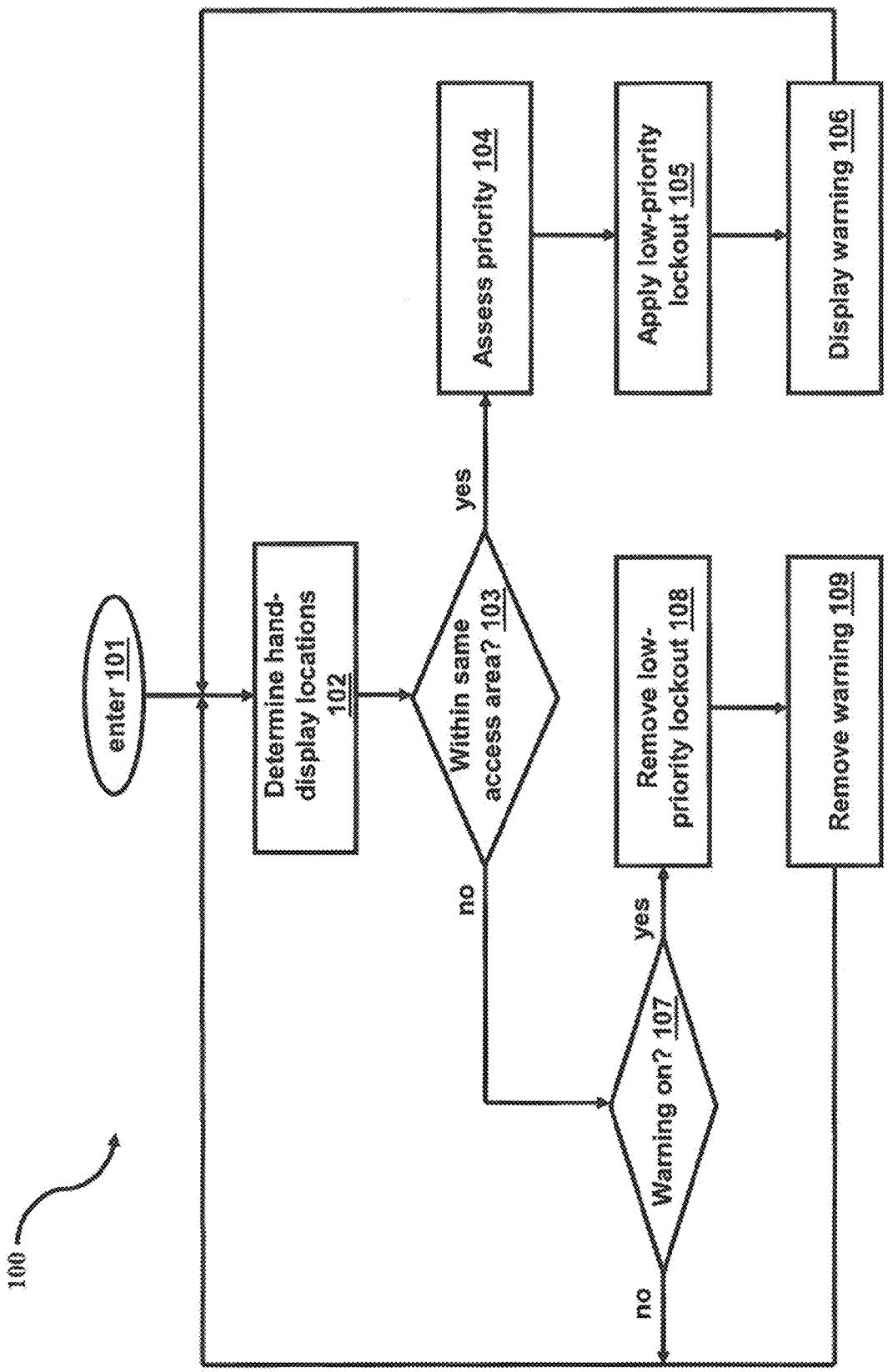
FIG. 19 is a flowchart of a computer program module for controlling touch screen dual-use activation according to an embodiment herein.

FIG. 19 is a flowchart of a novel computer program module 100 residing in computer 23 (of FIG. 16) for controlling the touch panel dual-use activation. Following initiation (101), the program determines (102) the touch screen hand locations as estimated from the values received from the hand-locating interrogator 27 (of FIG. 18(A)) to the computer 23 via data line 40 (of FIG. 16). From this information the program checks (103) whether the two hands are within the same button access area. If so, the program assesses (104) the priority from the tasks being performed and designates (105) the user with the lower priority for access lockout and displays (106) a warning alert accordingly. If the hands are sufficiently separated so as not to generate reach-conflict, the program removes (108) the low-priority access lockout and removes (109) the warning alert if it is applied (107). The computer program module 100 cycles during machine operation providing a continual real time update of the priority assignment.

Figure 20:
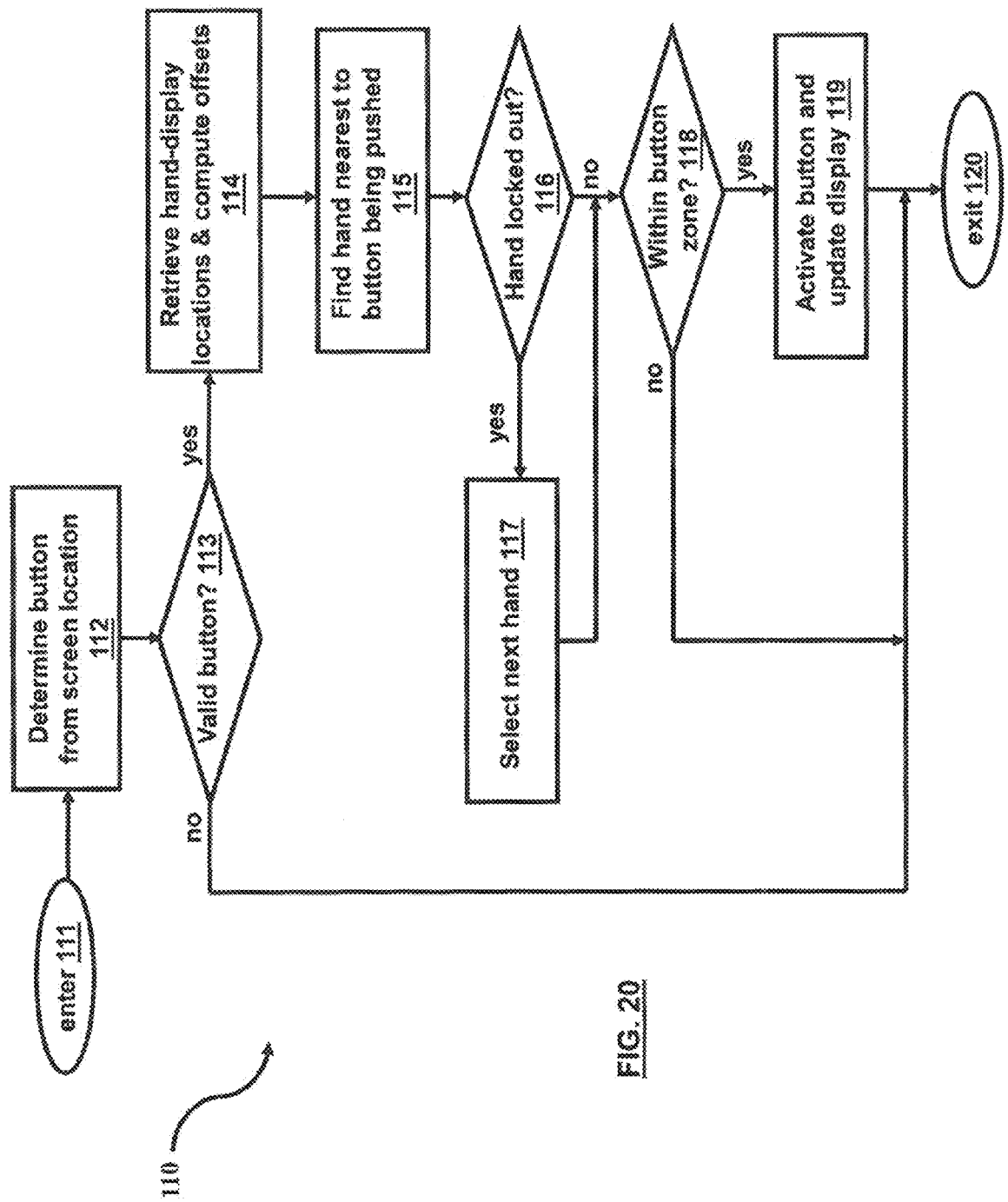
FIG. 20 is a flowchart of a computer program module for controlling touch screen button activation according to an embodiment herein.

As shown in the flowchart of FIG. 20, the priority assignment is used in computer program module 110 to control the touch screen button activation. The computer program module 110 is called (111) upon receipt of a touch point interruption from the screen controller for display monitor 50 (of FIG. 17(A)). The computer program module 110 determines (112) the button 51, 52 corresponding to the touch point screen location, and if it determines (checks) (113) it is a valid display button, the computer program module 110 retrieves (114) the hand-display locations and computes the offsets of the hands from the touched button 51, 52. With the offsets, the program finds (115) the hand nearest to the button 51, 52, checks (116) the activation priority (i.e., whether the hand is locked out), and if the hand is locked out, the program selects (117) the next hand. If the hand is not locked out, then the program checks (118) to see if the selected hand is within activation distance of the button 51, 52, and if so (yes), activates (119) the touched button and updates the display monitor 50 (of FIG. 17(A)) before exiting (120). If the hand is not within the activation distance of the button 51, 52, then the program proceeds to exit (120) the computer program module 110 without activation.

Figure 21:
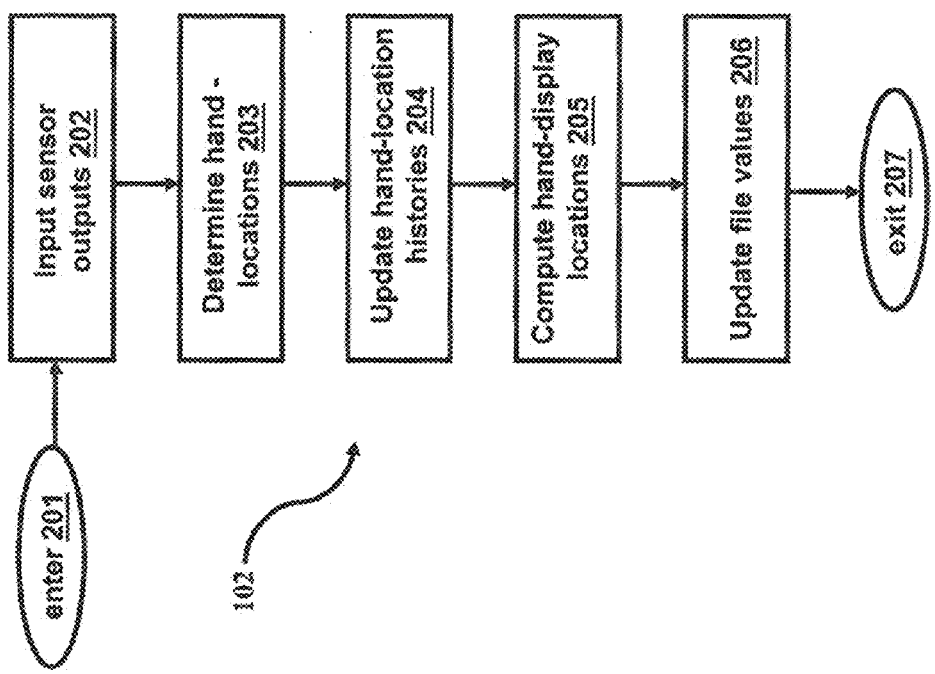
FIG. 21 is a flowchart of a computer program module for determining the hand location in screen coordinates according to an embodiment herein.

FIG. 21 flowcharts the subroutine 102 for determining the touch screen hand locations in computer program module 100 (of FIG. 19). Following program call (201), the routine inputs (202) the hand sensor outputs as received from the hand-locating interrogator 27 (of FIG. 18(A)) to the computer 23 via data line 40 (of FIG. 16), converts (203) the inputs to the hand locations in the workspace coordinates, updates (204) the locator history records used in estimation, and computes (205) the best estimate of the hand locations and converts the same into screen coordinates. In a further embodiment, a non-linear filter (not shown), such as an extended Kalman filter, is used to estimate the current hand locations from the updated history, and predict the locations from the estimated values. Preferably, the Kalman filter is a single lag order and the size of the tracking history is determined by the number of filter state variables. In another embodiment using an autoregressive moving average (ARMA) filter, the history size is determined by the number of state variables and the filter order. The routine saves (206) the values in a reference file before returning (207) to the computer program module 100 (of FIG. 19).

Figure 22:
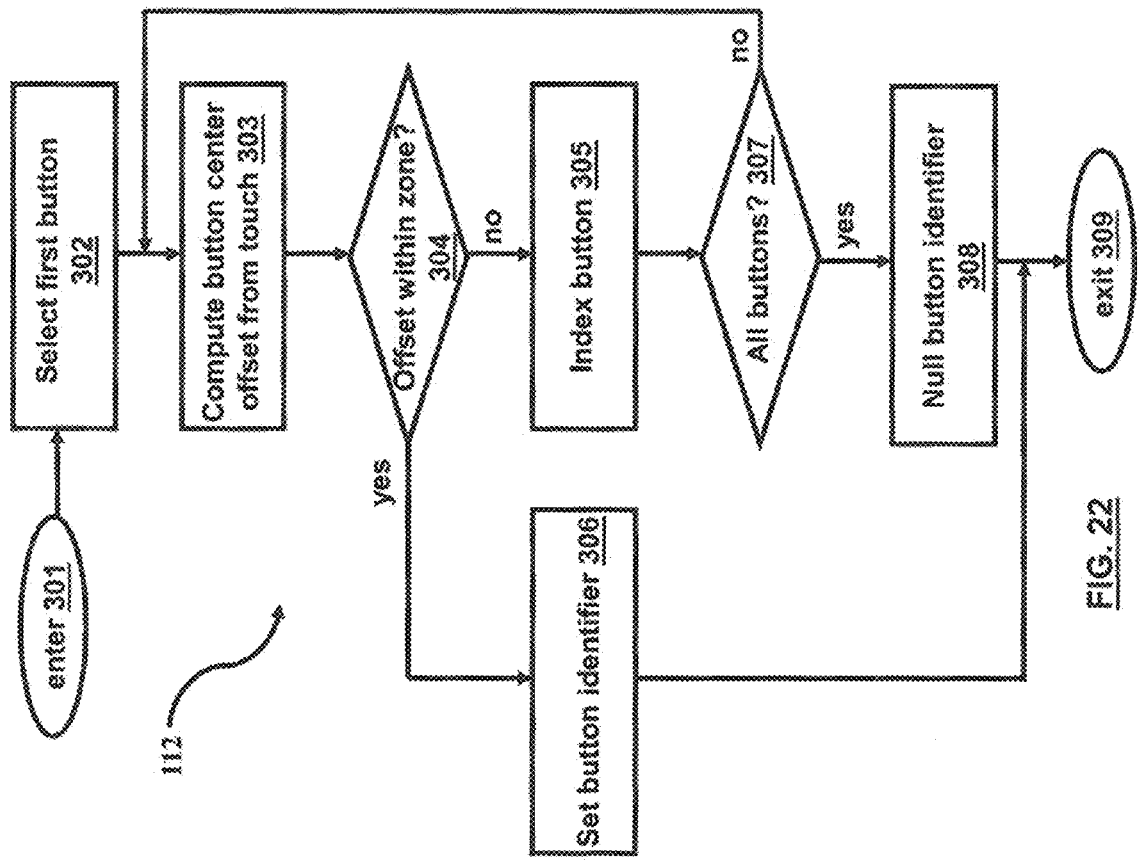
FIG. 22 is a flowchart of a computer program module for determining the touch panel button identity from the hand screen location according to an embodiment herein.

FIG. 22 flowcharts the subroutine 112 for determining the touch point button in the computer program module 110 (of FIG. 20). Following program call (301), the routine cycles (302) through the button screen coordinate list while computing (303) the offset between the screen coordinates for the touch point and the button center, checking (304) if the offset is within the button activation distance, and if so, setting (306) the touched button identifier and exiting (309), and if not, indexing (305) through the list and repeating the process, until all buttons have been tested (307), where upon the touch button identifier is set (308) to a null value before returning (309) to the computer program module 110 (of FIG. 20).

The embodiments described above for facilitating the operation of the display by touch screen buttons apply by extension to other switch technologies such as bezel switches and panel contact switches, among others based on manual contact that are used by both crewmembers. As with the touch screen, a switch processor (not shown) determines the switch that is activated and informs the computer 23 via data line as in FIG. 16. The hand-locating interrogator 27 with data line 40 to computer 23 records the locations of the crewmember hands. The computer uses this data to determine the activation source and consequently the display action including conflict alerts when both users are in the vicinity of the same switch area. For example, in some display designs, bezel switches are placed about the display housing for setting display status conditions such as the type of display (i.e., digital map, system status, etc.) as well as the brightness level and format. While the function of the switch is indicted by the label, legends are displayed at the display side near the switch to confirm the status to the user. Since the users may need to configure their displays differently, activation knowledge is needed for setting the display status and resolution alerts. Similarly, panel contact switches serve similar roles.

In another embodiment, the display monitor 50 (of FIG. 17(A)) is operated by hand controllers (not shown) that are commonly festooned with buttons and used in computer games. This method may be used with the display touch panel buttons 51, 52 and icons. The crewmember holds the controller in both hands while operating a miniaturized joy-stick with the fingers or thumb to move a display cursor over a display touch screen button 51, 52 or icon and then activating the display from the controller with a button push. In a further embodiment, the controller 77 (of FIG. 18(A)) can incorporate MEMS inertial sensors to detect the controller motion and the crewmember may use hand movements to move the display cursor to the locality of the display icon and then the controller joystick and buttons to complete the selection. While this method ensures completely independent operation of the same display monitor 50 (of FIG. 17(A)) by the two crewmembers without view obscuration as may happen with manual touch screen activation, a method must be provided for the display driver to differentiate between the control inputs. The controller 77 (of FIG. 17(A)) signals sent to the display processor by wire or infrared transmission include the controller identification.

The switching action depends upon the identities of the crewmembers, their task status and procedural scripts, and the touch panel button 51, 52 or display icon activated. This is true too for the bezel or contact switch activation. The crew identity is determined from the hand locations for the touch panel or switch, and the mapping of the identification numbers for the hand controllers to the users. The identity of the crew determined the particular task being performed. The touch panel button 51, 52 activated is determined from the touch panel controller 77; the display icon by the position of the display cursor. The touch must be within the button activation window for activation to occur; similarly, the display cursor must lie within the icon selection window. The particular activation made including the display update is determined by the mapping of the button 51, 52 or icon to the task options as determined by the script and status.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims. All references mentioned herein are hereby incorporated by reference.

What is claimed is:

1. A shared video display system for use by crewmembers, the system comprising:
 a computer processor;
 a display monitor comprising a common display driver configured to provide multiple separate virtual displays to at least two fixed crewmember user stations, the display monitor positioned adjacent to the user stations with each of the virtual displays being visible only to a user at a respective user station based on the angle of view of the user at that respective user station with respect to the display monitor, and the virtual display are configured to provide different displayed images to the users at the respective user stations for aiding users in performing separate tasks;
 one or more shared activators associated with the display monitor which are configured to be manually activated by users and perform at least one different action at each of the user stations so as to allow users to perform separate tasks at the user stations with the same one or more shared activators; and
 one or more systems configured to track the locations of the hands of said users at the user stations with respect to the one or more shared activators associated with the display monitor,
 wherein actions associated with the one or more activators for performing separate tasks at different user stations are controlled according to a user priority determination algorithm executed by said computer processor which is configured to react, based on the tracked hand locations of users, if multiple users at different user stations attempt to activate the same activator associated with the display monitor at the same time to prevent conflicting actions associated with the same activator from occurring.

2. The video display system of claim 1, wherein said display monitor comprises one or more virtual displays configured to allow said users to direct display of said display monitor by the one or more activators according to said user priority determination algorithm.

3. The video display system of claim 2,
 wherein said user priority determination algorithm controlling activation of said display monitor depends upon one or more of the following: identity of said users, locations of hands of said users, or status of tasks being performed by said users,
 wherein the identity of said users is determined from an assigned sensor for a particular crewmember user of a hand position sensing system;
 wherein said locations of hands of said users are determined by the said hand position sensing system;
 wherein said status of tasks being performed by said users is determined from activation history for the task; and
 wherein said priority determination algorithm depends upon one or more of the following: ranks of said crewmember users as determined by identities of said users, and an importance of tasks of said users, determined from said status of tasks being performed.

4. The video display system of claim 1, wherein said one or more systems configured to tracking the locations of the said hands of said users, comprise:

one or more magnetic source elements configured to be mounted on any of hands and wrists of said users; and one or more magnetic field sensors which use a magnetic field source for tracking the hands of said users based on sensed magnetic field intensities.

5. The video display system of claim 1, wherein said one or more systems configured to tracking the locations of the said hands of said users, comprise:

one or more infrared light sources configured to be mounted on any of hands and wrists of said users; and one or more optical sensors which sense said infrared light sources to track said hands of said users based on light intensities.

6. The video display system of claim 1, wherein said one or more systems configured to tracking the locations of the said hands of said users, comprise:

one or more optical cameras comprising an image processor adapted to track said hands of said users.

7. The video display system of claim 1, wherein said one or more systems configured to tracking the locations of the said hands of said users, comprise:

one or more acoustic transmitters configured to be mounted on any of hands and wrists of said users; and one or more acoustic sensors configured to track said hands based on sound intensities sensed from said acoustic transmitters.

8. The video display system of claim 1, wherein said one or more systems configured to tracking the locations of the said hands of said users, comprise:

one or more inertia sensors configured to be mounted on any of hands and wrists of said users, wherein the one or more inertia sensors are configured to track movements of said hands of said users.

9. The video display system of claim 1, wherein said one or more systems configured to tracking the locations of the said hands of said users, comprise:

one or more short range radio frequency identification (RFID) tags configured to be mounted on any of hands and wrists of said users, wherein the one or more RFID tags are adapted to track a location of said hands of said users.

10. A method of sharing a video display system by crewmembers, said method comprising:

using a display monitor comprising a common display driver to provide multiple separate virtual displays to multiple fixed crewmember user stations, the display monitor positioned adjacent to the user stations with each of the virtual displays being visible only to a user at a respective user station based on the angle of view of the user at that respective user station with respect to the display monitor, and the virtual display are configured to provide different displayed images to the users at the respective user stations for aiding users in performing separate tasks, wherein said display monitor is configured to be activated by one or more shared activators, with activators being associated with the display monitor and which are configured to be manually activated by users at the user stations and perform at least one different action at each of the user stations so as to allow users to perform separate tasks at the user stations with the same one or more shared activators, the locations of the hands of said users at the user stations are tracked with respect to the one or more shared activators associated with the display monitor, and the actions associated with the one or more activators for performing separate tasks at different user stations are controlled according to a user priority determination algorithm executed by a computer processor operatively connected to said display monitor which is configured to react, based on the tracked hand locations of users, if multiple users at different user stations attempt to activate the same activator associated with the display monitor at the same time to prevent conflicting actions associated with the same activator from occurring.

11. The method of claim 10, further comprising configuring one or more virtual displays on said display monitor to allow said users to direct display of said display monitor by the one or more activators according to said user priority determination algorithm.

12. The method of claim 11, wherein said user priority determination algorithm controlling access to said display monitor depends upon one or more of the following: identity of said users, locations of hands of said users, or status of tasks being performed by said users;

wherein the identity of said users is determined from an assigned sensor for a particular crewmember user of a hand position sensing system;

wherein said locations of hands of said users are determined by the said hand position sensing system;

wherein said status of tasks being performed by said users is determined from activation history for the task; and wherein said priority determination algorithm depends upon one or more of the following: ranks of said crewmember users as determined by identities of said users, and an importance of tasks of said users, determined from said status of tasks being performed.

13. The method of claim 10, further comprising:

providing one or more magnetic source elements for mounting on any of hands and wrists of said users; and configuring one or more magnetic field sensors to use a magnetic field source for tracking the hands of said users based on sensed magnetic field intensities.

14. The method of claim 10, further comprising:

providing one or more infrared light sources for mounting on any of hands and wrists of said users; and configuring one or more optical sensors to sense said infrared light sources to track said hands of said users based on light intensities.

15. The method of claim 10, further comprising configuring one or more optical cameras comprising an image processor to track said hands of said users.

16. The method of claim 10, further comprising:

providing one or more acoustic transmitters for mounting on any of hands and wrists of said users; and configuring one or more acoustic sensors to track said hands based on sound intensities sensed from said acoustic transmitters.

17. The method of claim 10, further comprising providing one or more inertia sensors for mounting on any of hands and wrists of said users to track movements of said hands of said users.

18. The method of claim 10, further comprising providing one or more short range radio frequency identification (RFID) tags for mounting on any of hands and wrists of said users to track a location of said hands of said users.

19. The method of claim 18, further comprising providing one or more short range radio frequency identification (RFID) tags for mounting on any of the knuckle, thumb and finger joints and segments of said hand for tracking the locations of the same of said user.

20. The method of claim 19, further comprising tracking the locations of one or more hand elements to operate a virtual touch panel on said display monitor by using hand movements and hand element configurations to locate a virtual touch icon within a display button and select the same.

21. The video display system of claim 1,
wherein said display monitor comprises the said one or more activators.

22. The video display system of claim 1, wherein said user priority determination algorithm is configured to direct the system to generate an audible and/or visual warning, prevent action for a user having the lower priority, and/or update the display monitor, in response to users attempting to activate the same activator of the display monitor.

23. The method of claim 10, wherein said user priority determination algorithm is configured to direct the video display system to generate an audible and/or visual warning, prevent action for a user having the lower priority, and/or update the display monitor, in response to users attempting to activate the same activator of the display monitor.

* * * * *